United States Patent
Yanai et al.

(10) Patent No.: US 11,670,780 B2
(45) Date of Patent: Jun. 6, 2023

(54) FUEL CELL GAS SUPPLY AND DIFFUSION LAYER, FUEL CELL SEPARATOR AND FUEL CELL STACK

(71) Applicants: ENOMOTO CO., LTD., Uenohara (JP); UNIVERSITY OF YAMANASHI, Kofu (JP)

(72) Inventors: Hiroshi Yanai, Uenohara (JP); Mitsunori Nasu, Uenohara (JP); Masahiro Watanabe, Kofu (JP)

(73) Assignees: Enomoto Co., Ltd.; University Of Yamanashi

( * ) Notice: Subject to any disclaimer, the term of this patent is extended or adjusted under 35 U.S.C. 154(b) by 213 days.

(21) Appl. No.: 17/049,871

(22) PCT Filed: Apr. 28, 2018

(86) PCT No.: PCT/JP2018/017353
§ 371 (c)(1),
(2) Date: Oct. 22, 2020

(87) PCT Pub. No.: WO2019/207811
PCT Pub. Date: Oct. 31, 2019

(65) Prior Publication Data
US 2021/0242472 A1    Aug. 5, 2021

(51) Int. Cl.
*H01M 8/026*    (2016.01)
*H01M 8/0234*    (2016.01)
(Continued)

(52) U.S. Cl.
CPC ......... *H01M 8/026* (2013.01); *H01M 8/0234* (2013.01); *H01M 8/0239* (2013.01); *H01M 8/0243* (2013.01); *H01M 8/241* (2013.01)

(58) Field of Classification Search
None
See application file for complete search history.

(56) References Cited

U.S. PATENT DOCUMENTS

| 6,350,540 B1* | 2/2002 | Sugita | H01M 8/0263 429/514 |
| 2007/0178359 A1* | 8/2007 | Peng | H01M 8/2484 428/167 |

(Continued)

FOREIGN PATENT DOCUMENTS

| JP | 2004-327358 A | 11/2004 |
| JP | 2007-299656 A | 11/2007 |

(Continued)

OTHER PUBLICATIONS

International Search Report (in English and Japanese) issued in PCT/JP2018/017353; dated Jul. 17, 2018; ISA/JP.

(Continued)

*Primary Examiner* — Alix E Eggerding
(74) *Attorney, Agent, or Firm* — Harness, Dickey & Pierce, P.L.C.

(57) ABSTRACT

A fuel cell gas supply and diffusion layer includes a sheet-like porous body layer, and a plurality of gas passage grooves formed on one surface of the porous body layer in parallel and formed in a zigzag shape or a wave shape respectively. As viewed in a plan view, a first rectangular region where circumscribes one gas passage groove and a second rectangular region where circumscribes a gas passage groove adjacent to the one gas passage groove overlap along a region in contact each other. An overlapping region where the first rectangular region and the second rectangular region overlap exists at any depth position of the grooves. According to the fuel cell gas supply and diffusion layer, it is possible to increase a power generation efficiency of a fuel cell.

18 Claims, 29 Drawing Sheets

(51) Int. Cl.
     *H01M 8/0239*     (2016.01)
     *H01M 8/0243*     (2016.01)
     *H01M 8/241*      (2016.01)

(56)             References Cited

U.S. PATENT DOCUMENTS

| | | |
|---|---|---|
| 2011/0236792 A1 | 9/2011 | Kawashima et al. |
| 2016/0260987 A1* | 9/2016 | Watanabe ........... H01M 8/2465 |
| 2017/0194659 A1 | 7/2017 | Jin et al. |
| 2017/0222241 A1 | 8/2017 | Schweiss |
| 2017/0365862 A1* | 12/2017 | Yamasaki ........... H01M 4/8657 |
| 2021/0143460 A1* | 5/2021 | Ishimoto ............. H01M 4/8605 |

FOREIGN PATENT DOCUMENTS

| | | |
|---|---|---|
| JP | 2008-293811 A | 12/2008 |
| JP | 2013-020843 A | 1/2013 |
| KR | 10-2017-0029570 A | 3/2017 |
| WO | 2015-072584 A1 | 5/2015 |

OTHER PUBLICATIONS

European Search Report issued for the corresponding European Patent Application No. 18916875.0; dated Nov. 11, 2021 (total 7 pages).

* cited by examiner

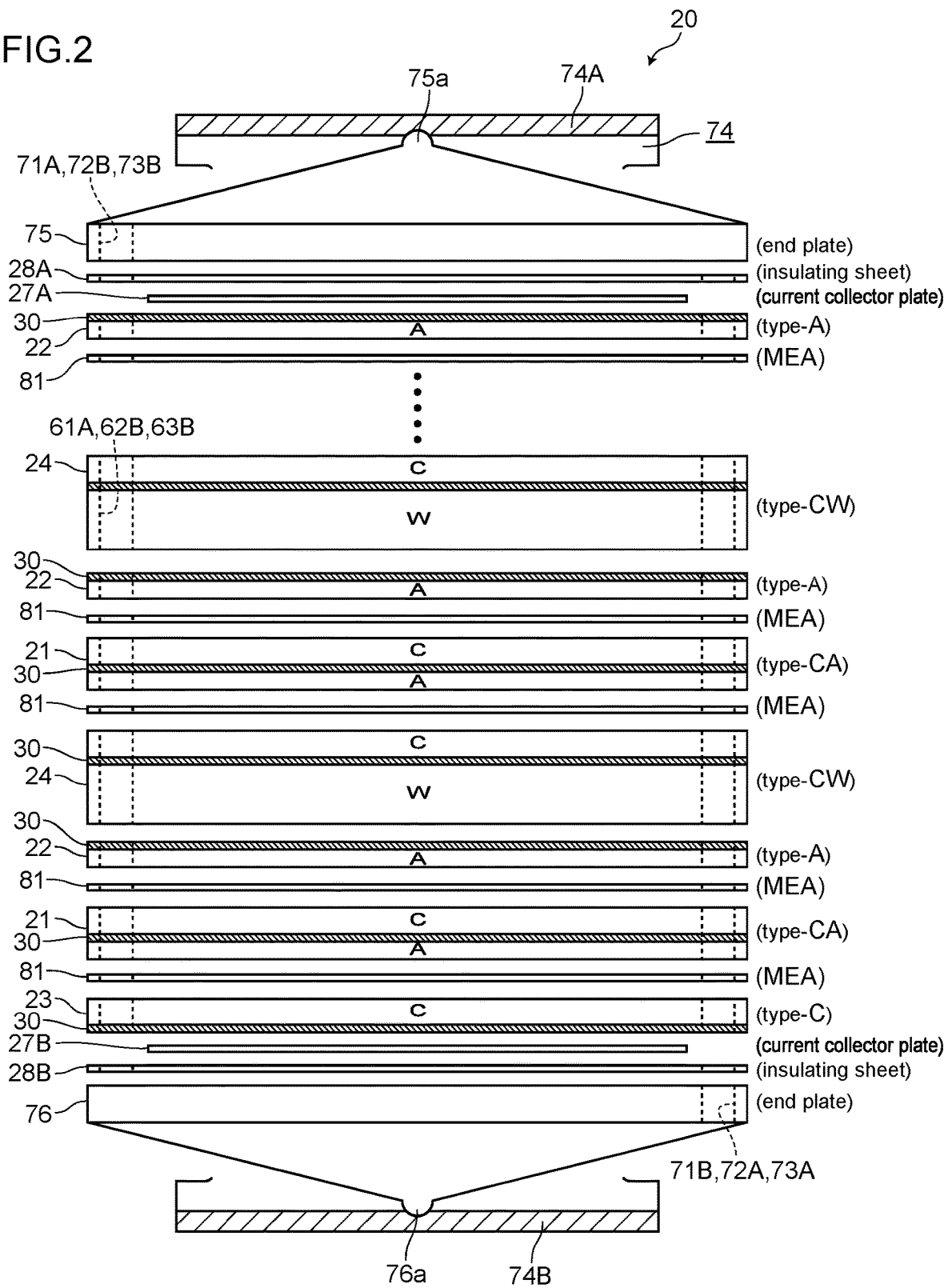

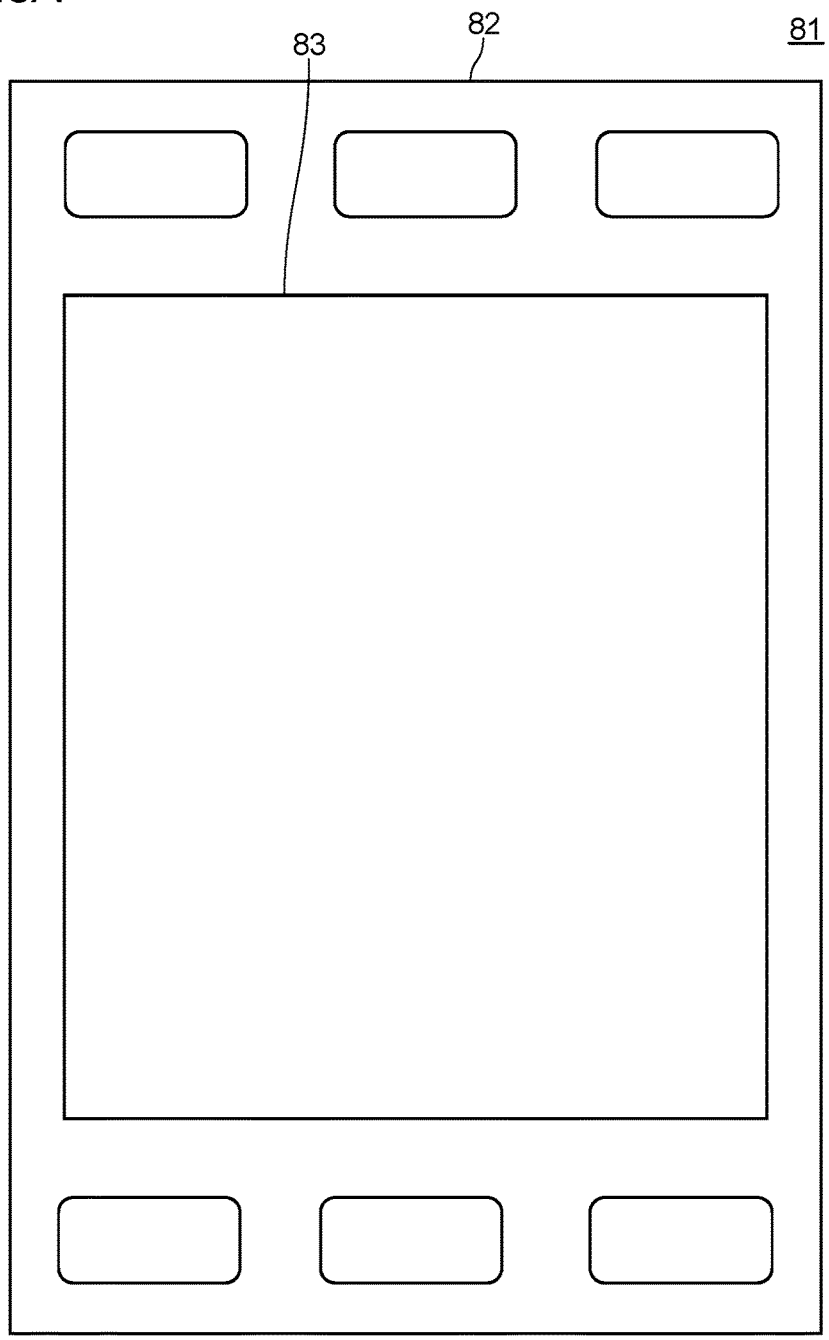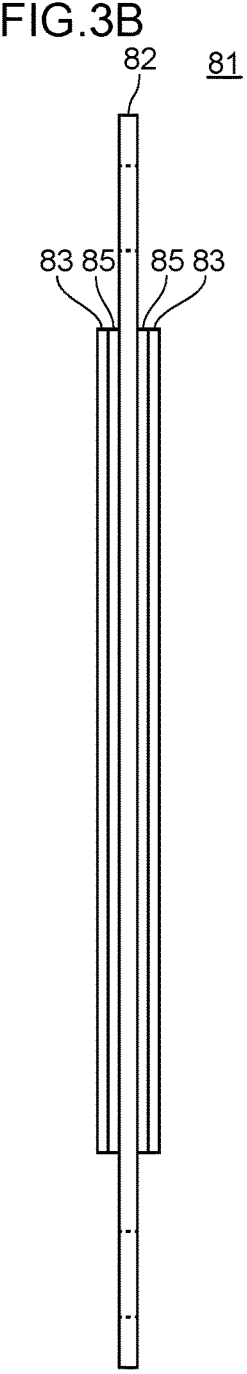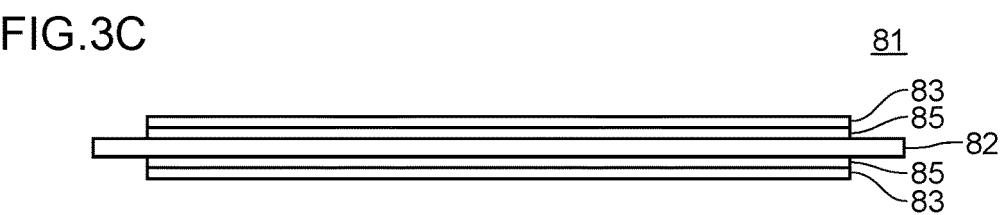

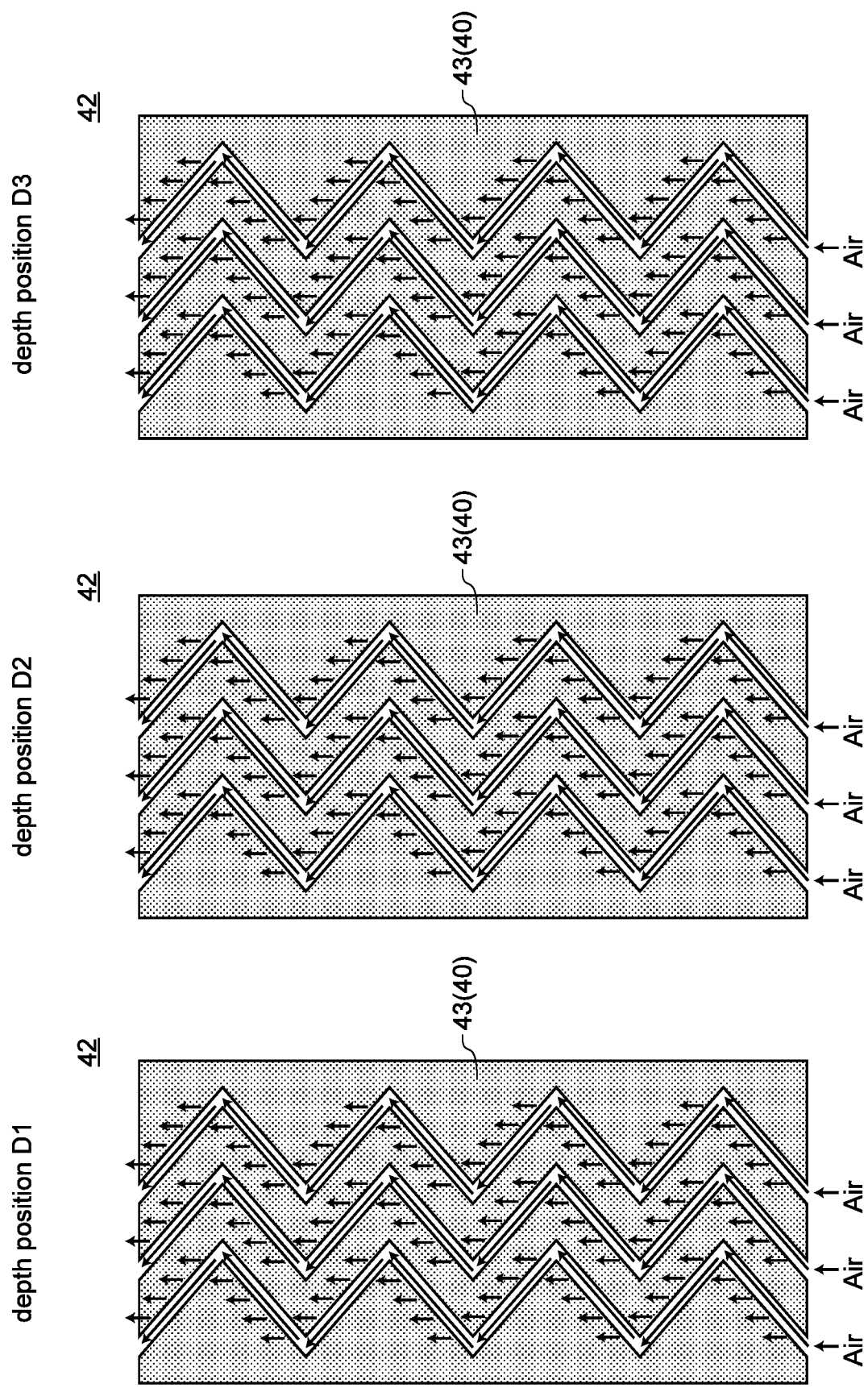

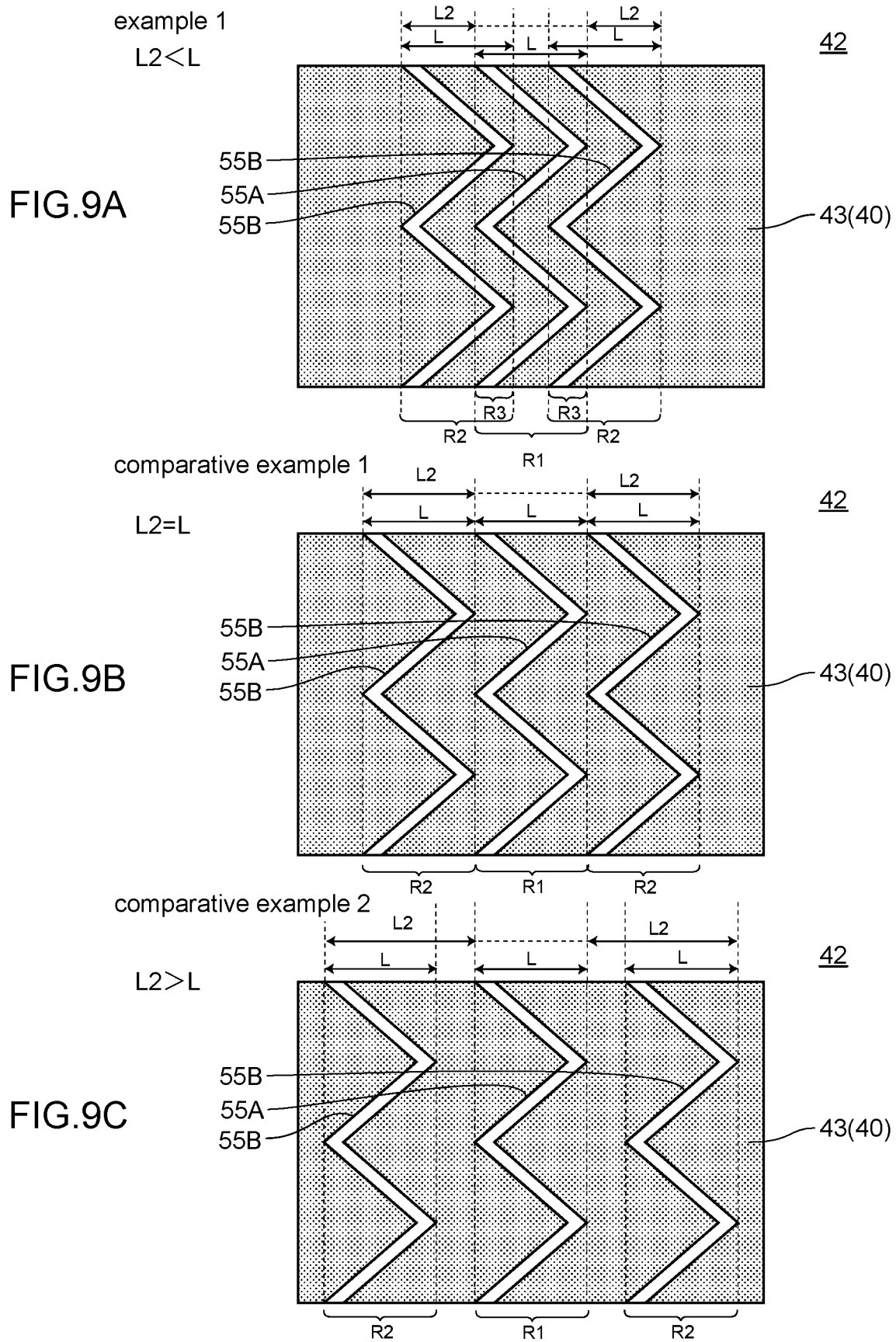

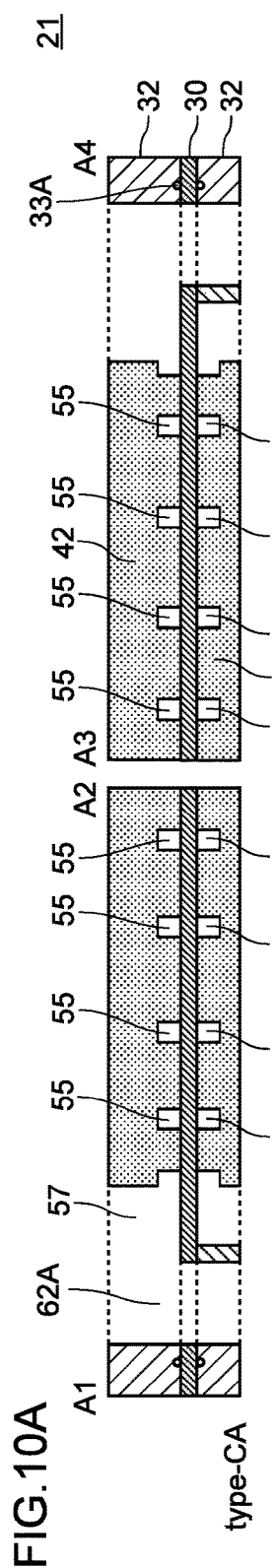

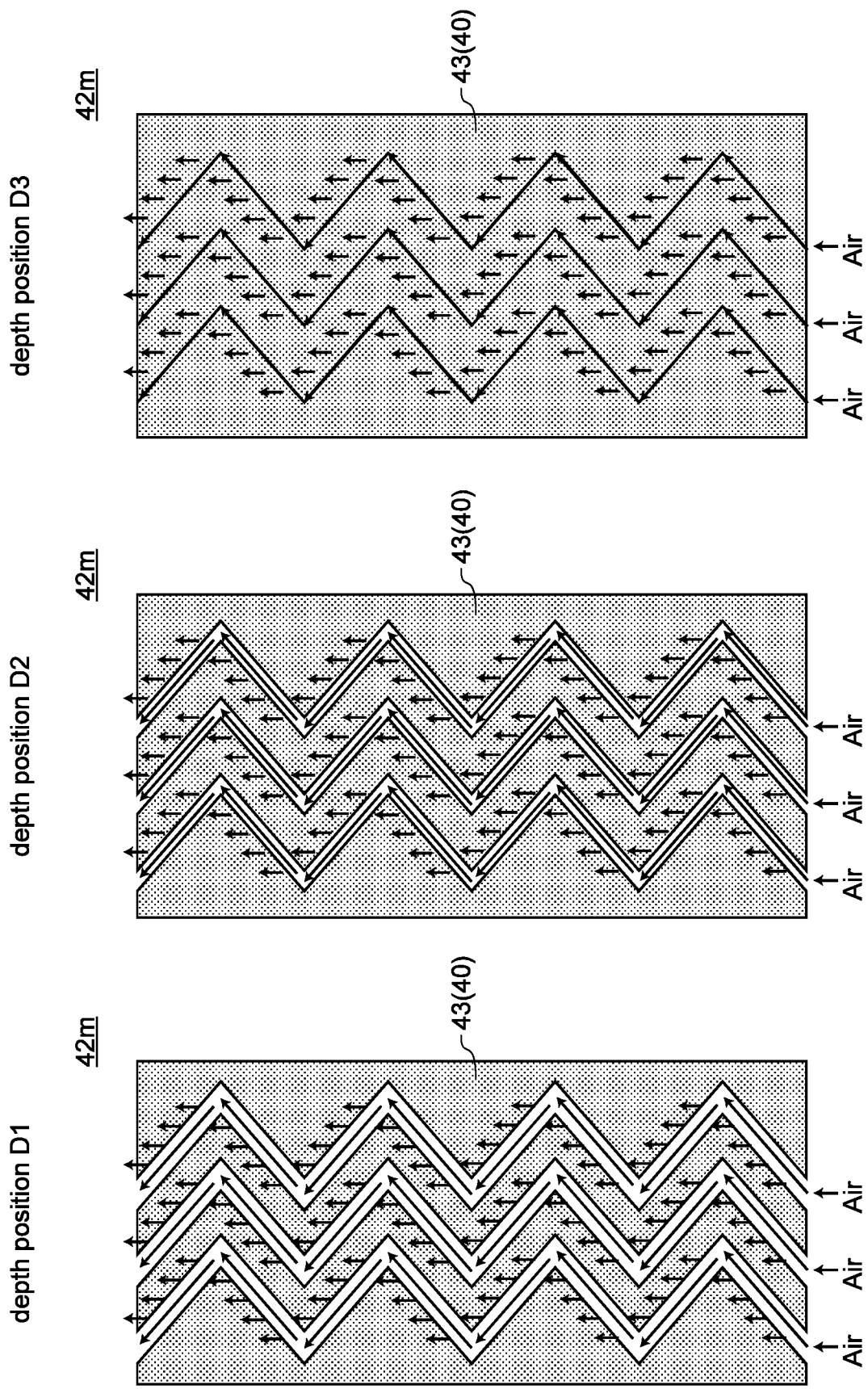

FUEL CELL GAS SUPPLY AND DIFFUSION LAYER, FUEL CELL SEPARATOR AND FUEL CELL STACK

CROSS REFERENCE TO RELATED APPLICATIONS

This application is a U.S. National Stage application of International Application No. PCT/JP2018/017353 filed on Apr. 28, 2018. The disclosures of all contents described in the above application is hereby incorporated by reference in its entirety.

BACKGROUND

Technical Field

The present invention relates to a fuel cell gas supply and diffusion layer, a fuel cell separator and a fuel cell stack.

Related Art

In a technical field of a polymer electrolyte fuel cell (PEFC: Polymer Electrolyte Fuel Cell), there has been known a fuel cell stack which can supply and diffuse fuel cell gas (anode gas, cathode gas) uniformly (see WO2015/072584). FIG. 26 is a front view of schematically showing a conventional fuel cell stack 920. FIG. 27 and FIG. 28 are plan views of a type-CA separator 921 in the conventional fuel cell stack 920. FIG. 27 is a plan view as viewed from a fuel cell gas supply and diffusion layer (a cathode gas supply and diffusion layer) 942 side. FIG. 28 is a plan view as viewed from a fuel cell gas supply and diffusion layer (an anode gas supply and diffusion layer) 941 side. FIG. 29 is a cross-sectional view taken along line A-A of FIG. 27.

The conventional fuel cell stack 920 has a structure in which a plurality of separators (type-CA separators 921, a type-A separator 922, type-C separators 923, type-AW separators 924) are laminated. These separators have a structure in which a fuel cell gas supply and diffusion layer made of a porous body layer (porous material layer) is placed on at least one surface of a metal plate 30 as shown in FIG. 26 to FIG. 29. "A" of the type-CA separator 921, the type-A separator 922 and the type-AW separator 924 represents a fuel cell gas supply and diffusion layer (an anode gas supply and diffusion layer) 941. "C" of the type-CA separator 921 and the type-C separator 923 represents a fuel cell gas supply and diffusion layer (a cathode gas supply and diffusion layer) 942. "W" of the type-AW separator 924 represents a cooling water supply and diffusion layer. According to the conventional fuel cell stack 920, since the fuel cell gas supply and diffusion layers 941, 942 made of the porous body layer are formed on the separators itself, the fuel cell gas can be uniformly diffused over an entire surface of the fuel cell gas supply and diffusion layers. Consequently, according to the conventional fuel cell stack 920, the fuel cell gas can be uniformly supplied over an entire surface of a membrane electrode assembly (MEA) 81, and it is possible to increase a power generation efficiency of a fuel cell compared to a previous one.

In a technical field of a fuel cell, there is a need for a technology which can increase a power generation efficiency of the fuel cell compared to a previous technology. In the technical field of the polymer electrolyte fuel cell, there is the same need. It is an object of the present invention to provide a fuel cell gas supply and diffusion layer, a fuel cell separator and a fuel cell stack which can increase a power generation efficiency of a fuel cell compared to a conventional one.

SUMMARY

According to an embodiment of the present invention, there is provided a fuel cell gas supply and diffusion layer which includes: a sheet-like porous body layer capable of gas permeating and gas diffusing, and having conductivity; and a plurality of gas passage grooves formed on one surface of the porous body layer in parallel and formed in a zigzag shape or a wave shape from an inflow side to an outflow side of the gas, respectively. In the fuel cell gas supply and diffusion layer, as viewed in a plan view, in the plurality of rectangular regions R which circumscribe each gas passage groove of the plurality of gas passage grooves, a first rectangular region R1 where circumscribes one gas passage groove and a second rectangular region R2 where circumscribes a gas passage groove adjacent to the one gas passage groove overlap along a region in contact each other. In the fuel cell gas supply and diffusion layer, an overlapping region R3 where the first rectangular region R1 and the second rectangular region R2 overlap exists at any depth position of the plurality of gas passage grooves regardless of the cross-sectional shape of the plurality of gas passage grooves.

According to an embodiment of the present invention, there is provided a fuel cell separator includes a gas shielding plate and a fuel cell gas supply and diffusion layer disposed on at least one surface of the gas shielding plate. The fuel cell gas supply and diffusion layer is a fuel cell gas supply and diffusion layer of the present invention. The fuel cell gas supply and diffusion layer is disposed on the gas shielding plate as the plurality of gas passage grooves is located on the gas shielding plate side. In the fuel cell separator, gas flow paths are constituted of the gas passage grooves and the gas shielding plate.

According to an embodiment of the present invention, there is provided a fuel cell stack formed by laminating a fuel cell separator and a membrane electrode assembly. The fuel cell separator is a fuel cell separator of the present invention. The fuel cell separator and the membrane electrode assembly are laminated so that the membrane electrode assembly is positioned on a surface where the plurality of gas passage grooves is not formed in the fuel cell gas supply and diffusion layer.

Advantageous Effects of the Invention

According to the fuel cell gas supply and diffusion layer, the fuel cell separator and the fuel cell stack of the embodiment of the present invention, it is possible to increase a power generation efficiency of a fuel cell compared to a conventional one. Furthermore, according to the fuel cell gas supply and diffusion layer, the fuel cell separator and the fuel cell stack, they become a fuel cell gas supply and diffusion layer, a fuel cell separator and a fuel cell stack which have a superior drainability compared to the conventional one.

BRIEF DESCRIPTION OF THE DRAWINGS

FIG. 2 is a side view of schematically showing the fuel cell stack 20 according to the embodiment.

FIGS. 3A-3C are views for explaining a membrane electrode assembly (MEA) 81.

FIGS. 8A-8C are views showing planar structures of the gas passage grooves at different depth positions.

FIGS. 9A-9C are views showing relationships among a first rectangular region R1, second rectangular regions R2, and overlapping regions R3.

FIGS. 10A-10D are cross-sectional views of fuel cell separators other than the fuel cell separator 23 (fuel cell separators 21, 22, 24, 25).

FIGS. 24A-24C are views showing the planar structure of the gas passage grooves at different depth positions in the modification 13.

DETAILED DESCRIPTION

Hereinafter, a fuel cell gas supply and diffusion layer, a fuel cell separator and a fuel cell stack of the present invention are described in detail with reference to a embodiment shown in figures.

Embodiment

Figure 1:
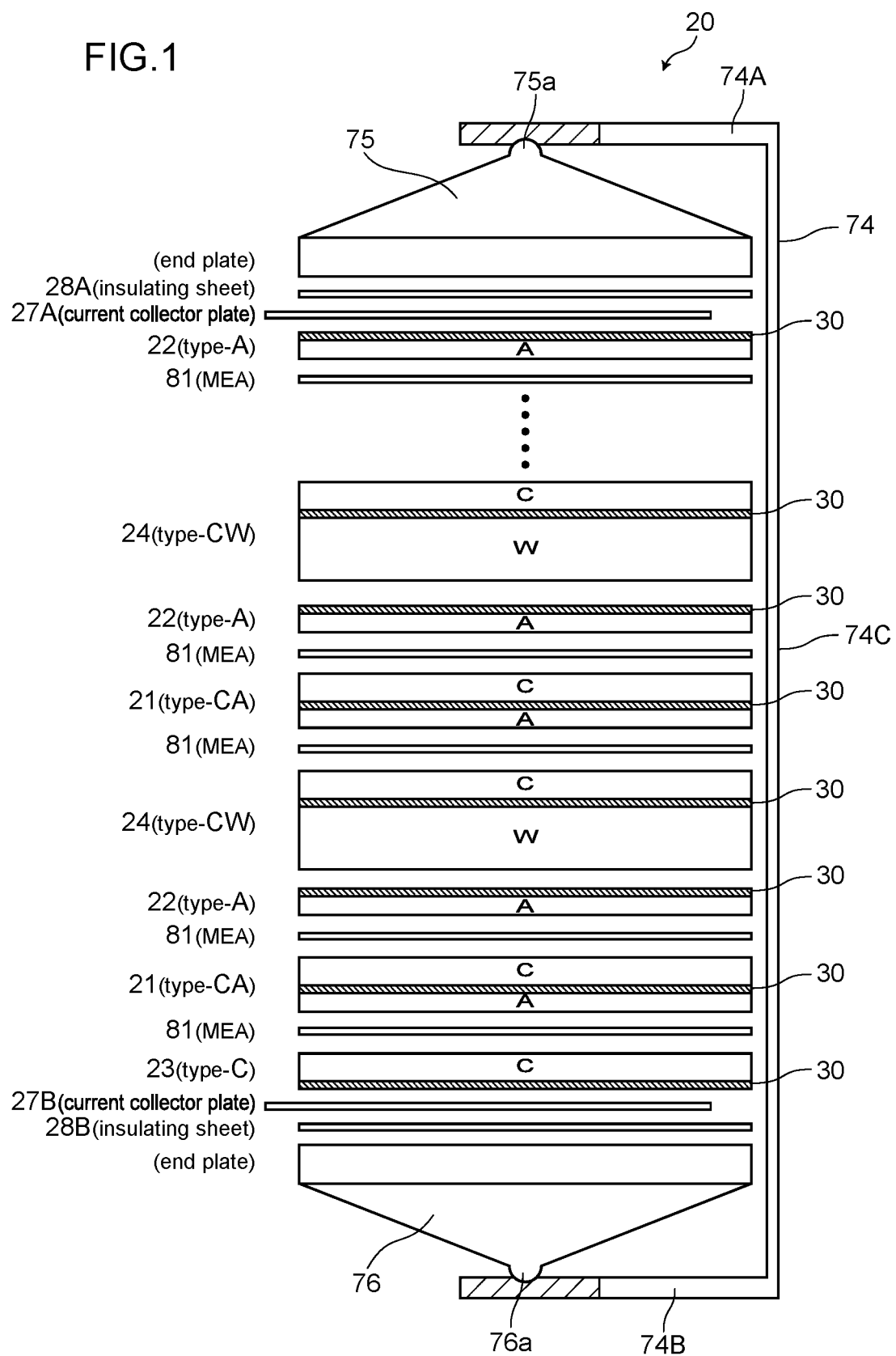
FIG. 1 is a front view of schematically showing a fuel cell stack 20 according to an embodiment.

FIG. 1 is a front view of schematically showing a fuel cell stack 20 according to an embodiment. FIG. 2 is a side view of schematically showing the fuel cell stack 20 according to the embodiment.

A fuel cell stack 20 according to an embodiment is a polymer electrolyte fuel cell (PEFC: Polymer Electrolyte Fuel Cell). The fuel cell stack 20 has a plurality of single cells. Each cell of the fuel cell stack 20 includes a membrane electrode assembly 81, an element constituting a cathode side and an element constituting an anode side. The two elements interpose the membrane electrode assembly 81 therebetween.

In a fuel cell separator 21, a cathode gas supply and diffusion layer C is formed on one surface of a metal plate 30 as a gas shielding plate, and an anode gas supply and diffusion layer A is formed on the other surface (a type-CA separator). In a fuel cell separator 22, an anode gas supply and diffusion layer A is formed on one surface of the metal plate 30 (a type-A separator). In a fuel cell separator 23, the cathode gas supply and diffusion layer C is formed on one surface of the metal plate 30 (a type-C separator). In a fuel cell separator 24, the cathode gas supply and diffusion layer C is formed on one surface of the metal plate 30, and a cooling water supply and diffusion layer W is formed on the other surface (a type-CW separator).

Each cell is arranged such that the cathode side and the anode side are alternated. The cathode gas supply and diffusion layer C and the anode gas supply and diffusion layer A are provided facing each other across the membrane electrode assembly (MEA) 81. In the embodiment, the cooling water supply and diffusion layer W for supplying cooling water is provided on each time the single cells are arranged two. The cooling water supply and diffusion layer W may be provided on each time the single cell is arranged one or may be provided on each time the single cells are arranged three or more. In the cooling water supply and diffusion layer W, so that the metal plate 30 (preferably, the metal plate 30 in the type-A separator or the type-C separator) is opposed, the fuel cell separator 21 to 24 are combined and laminated.

Although not shown in FIG. 1 and FIG. 2, a fuel cell stack of the present invention may include a separator in which an anode gas supply and diffusion layer A is formed on one surface of the metal plate 30, and a cooling water supply and diffusion layer W is formed on the other surface of the metal plate 30 (a type-AW separator). A fuel cell stack of the present invention may include a separator in which a cooling water supply and diffusion layer W is formed on one surface of the metal plate 30 (type-W separator). A fuel cell stack of the present invention may include a separator in which cooling water supply and diffusion layers W are formed on both sides of the metal plate. The configuration of each fuel cell separator is described in detail later.

At both ends of stacked cells, current collector plates 27A, 27B are disposed. In the outside of the current collecting plates 27A, 27B, end plates 75, 76 are disposed through insulating sheets 28A, 28B. The fuel cell separators 21 to 24 are pressed from both sides by the end plates 75, 76. In fuel cell separators located at both ends of the fuel cell stack 20 and contact with the current collector plates 27A, 27B, it is preferable that the metal plate 30 (a corrosion resistant layer) faces outward.

In FIG. 1 and FIG. 2, the fuel cell separators 21 to 24, the membrane electrode assembles 81, the current collector plates 27A, 27B, the insulating sheets 28A, 28B, and the end plates 75, 76 are drawn apart for facilitating understanding. However, they are closely joined to each other in the order of the sequences shown in FIG. 1 and FIG. 2. The joining method is not particularly limited. For example, these members may be joined by pressing the respective members from both sides by the end plates 75, 76. There members may be joined by bonding appropriate positions of the respective members with adhesives, and pressing the respective members from both sides by the end plates 75, 76. There members may be joined by other methods. Thickness of the fuel cell separators 21 to 24, the membrane electrode assembles 81, the current collector plates 27A, 27B, the insulating sheets 28A, 28B or the like is from about 100 μm to about 10 mm. Each figure of the embodiment in this specification is drawn with an exaggerated thickness.

At one end portion of the end plate 75 of the anode side, an anode gas supply port 71A, a cathode gas outflow port 72B and a cooling water outflow port 73B are provided, respectively. At one end portion of the end plate 76 of the cathode side (a side opposite to the one end portion of the end plate 75), an anode gas outflow port 71B, a cathode gas supply port 72A and a cooling water supply port 73A (in FIG. 2, these are collectively shown by broken lines) are provided. Supply pipes and discharge pipes of corresponding fluid are connected to each of the supply port and the discharge port.

In each separator in the fuel cell separators 21 to 24, an anode gas inflow port 61A communicating with the anode gas supply port 71A, a cathode gas (and generated water) outflow port 62B communicating with the cathode gas outflow port 72B, and a cooling water outflow port 63B communicating with the cooling water outflow port 73B are provided, respectively. Further, in each separator of the fuel cell separators 21 to 24, an anode gas outflow port 61B communicating with the anode gas outflow port 71B, a cathode gas inflow port 62A communicating with the cathode gas supply port 72A, and the cooling water inflow port 63A communicating with the cooling water supply port 73A are provided, respectively.

The cathode gas, the anode gas and the cooling water are supplied through the anode gas supply port 71A, the cathode gas supply port 72A and the cooling water supply port 73A. The embodiment exemplifies a case where hydrogen gas is used as the anode gas and air is used as the cathode gas.

Next, the membrane electrode assembly 81 is described.

FIGS. 3A-3C are views for explaining the membrane electrode assembly (MEA) 81. FIG. 3A is a plan view of the membrane electrode assembly 81. FIG. 3B is a front view of the membrane electrode assembly 81. FIG. 3C is a side view of the membrane electrode assembly.

As shown in FIGS. 3A-3C, the membrane electrode assembly 81 includes a polymer electrolyte membrane (PEM) 82, catalyst layers (CL) 85 disposed on both sides of the polymer electrolyte membrane 82 respectively, and microporous layers (MPL) 83 disposed on an outer surface of each catalyst layer 85. In the embodiment, those including the polymer electrolyte membrane 82 and the catalyst layers 85 disposed on both sides thereof are referred to as catalyst coated electrolyte membranes (Catalyst Coated Membrane: CCM). The microporous layer 83 includes pores having a finer diameter than the porous body layer 40. The microporous layer 83 may be omitted.

Next, the fuel separators 21 to 24 and the fuel cell gas supply and diffusion layer 42 are described.

Figure 4:
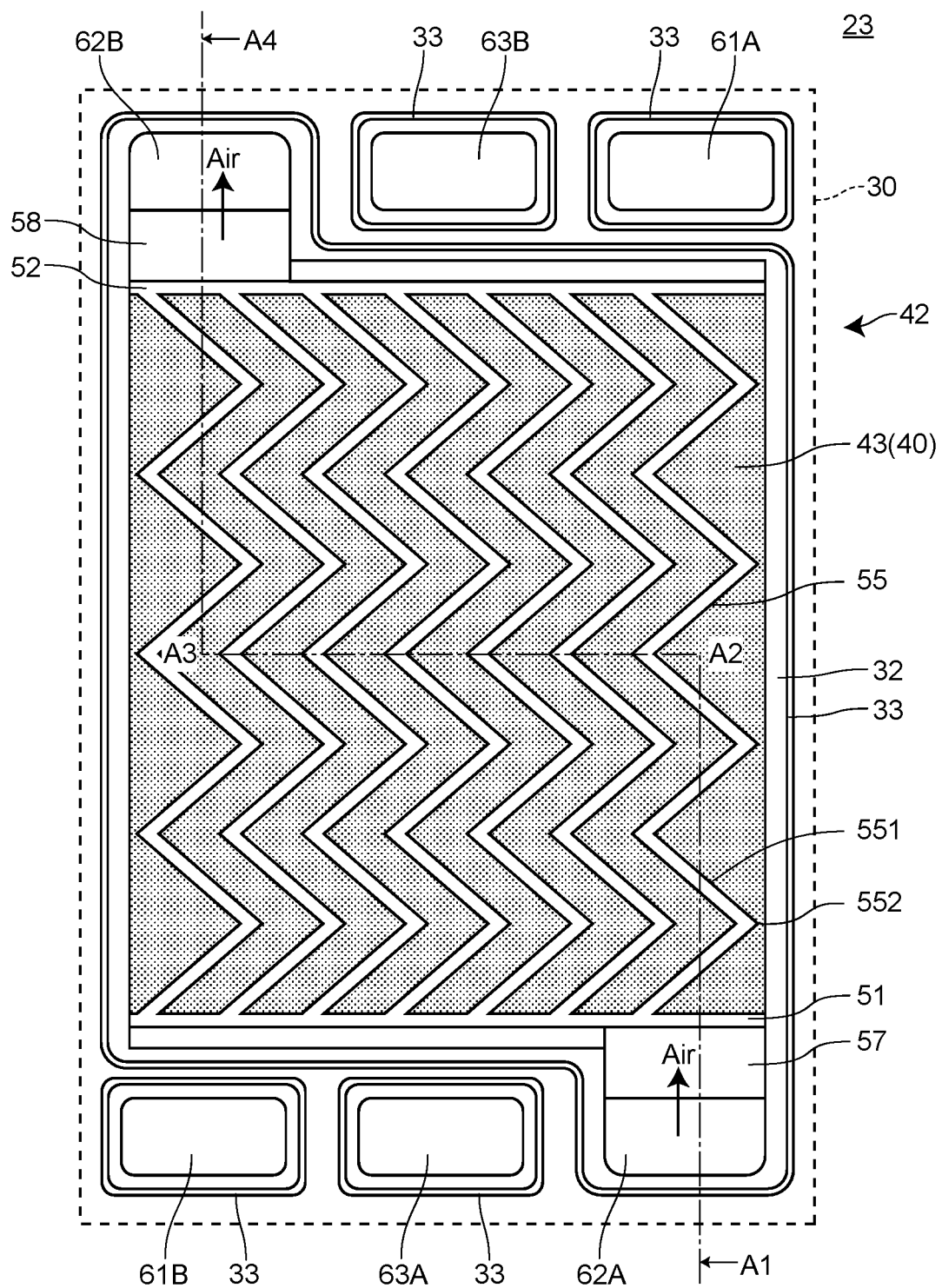
FIG. 4 is a plan view of a fuel cell separator 23 according to the embodiment.
Figure 5A:
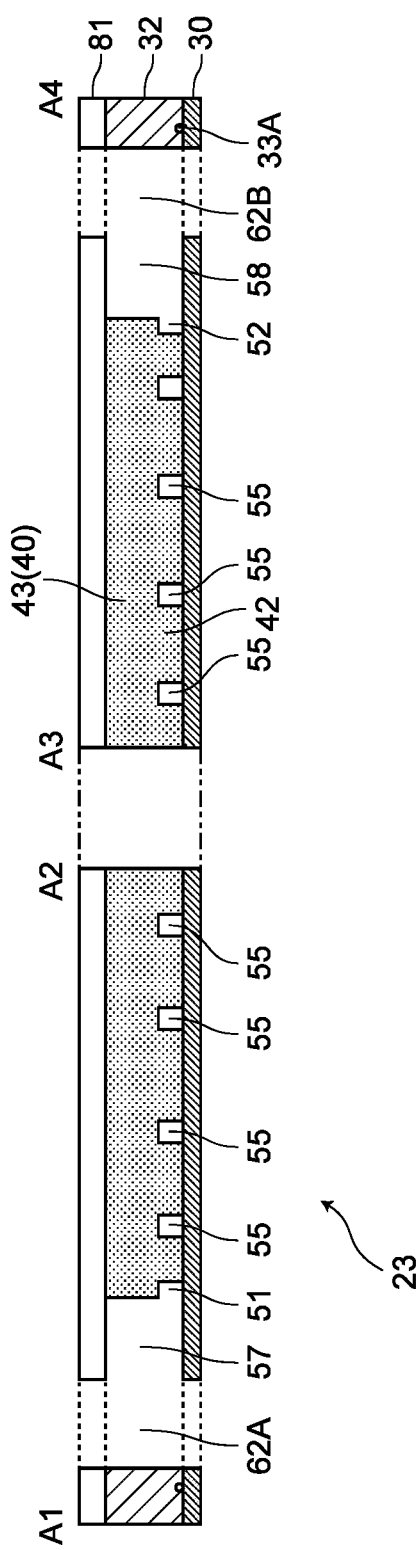
FIGS. 5A and 5B are cross-sectional views of FIG. 4.
Figure 5B:
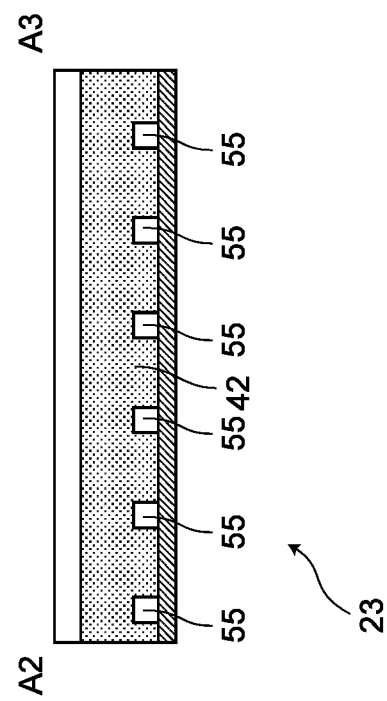

FIG. 4 is a plan view of the of type-C fuel cell separator 23 from a side of the metal plate 30. In FIG. 4, in order to represent a flow path pattern of the fuel cell separator 23 clearly, showing of the metal plate 30 is omitted. FIGS. 5A and 5B are cross-sectional views of FIG. 4. FIG. 5A is a cross-sectional view taken along line A1-A4 of FIG. 4 (line A2-A3 part is omitted). FIG. 5B is a cross-sectional view taken along line A2-A3 of FIG. 4. In FIGS. 5A and 5B, the fuel cell separator 23 is shown with the membrane electrode assembly 81 joined to show a positional relation of the fuel cell separator 23 and the membrane electrode assembly 81. In FIGS. 5A and 5B, a cross-sectional construction of the membrane electrode assembly 81 is omitted.

Figure 6:
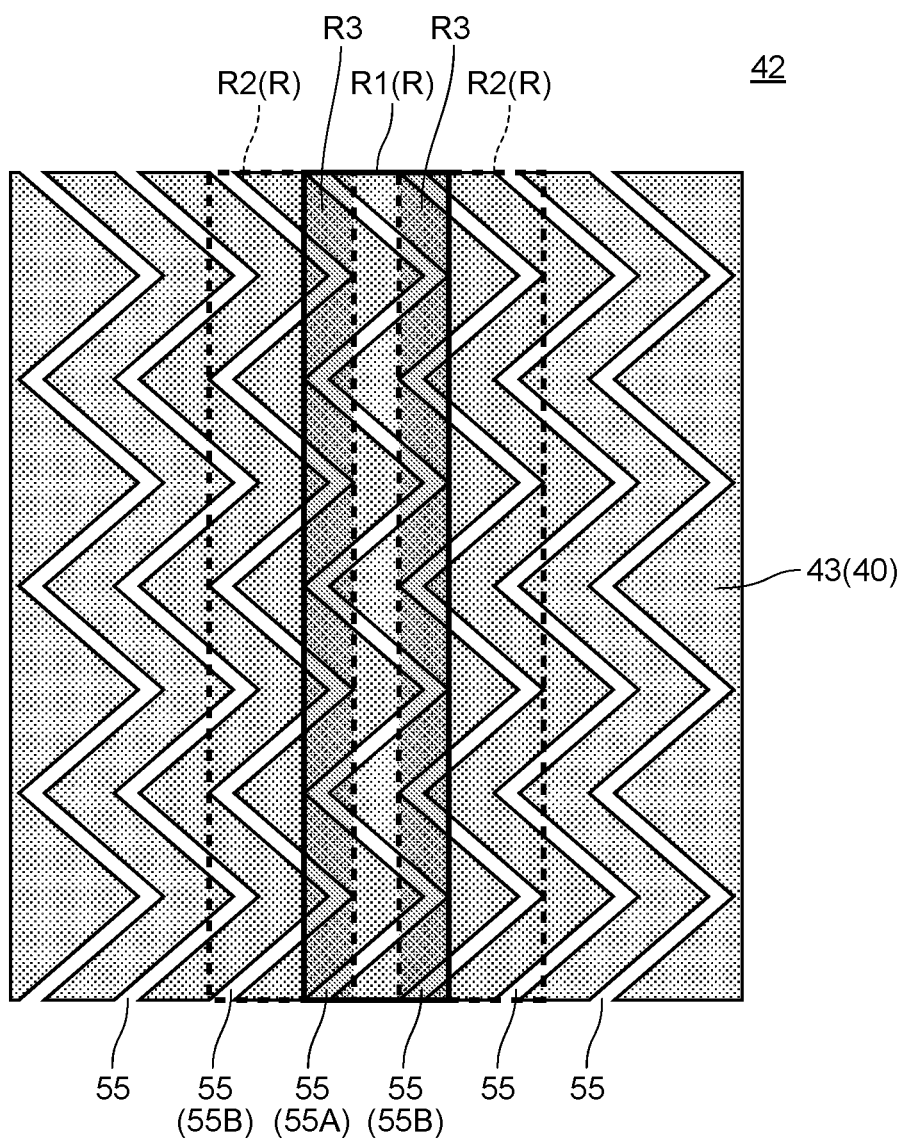
FIG. 6 is a view of a planar structure of gas passage grooves.
Figure 7A:
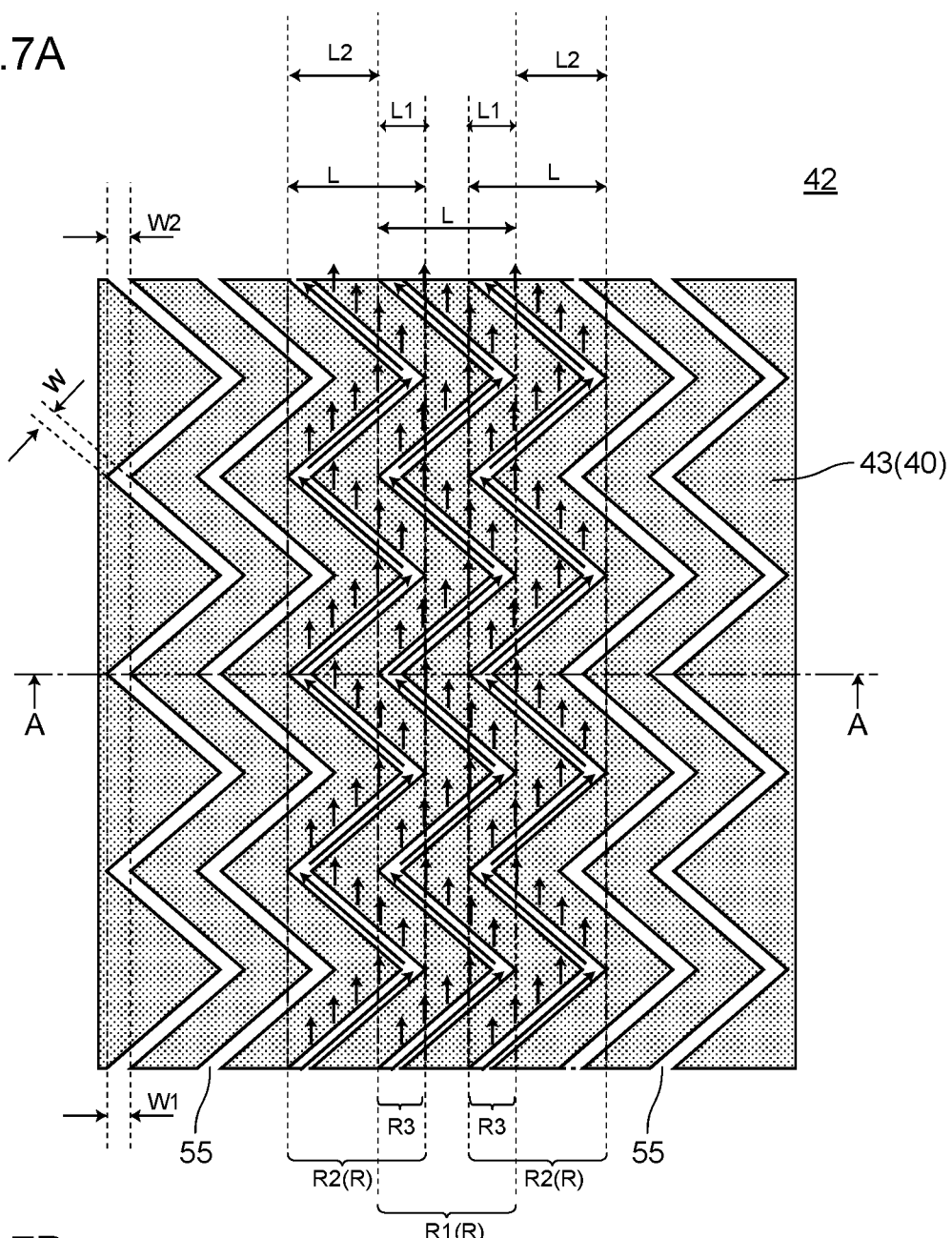
FIGS. 7A and 7B are views of the planar structure and a cross-sectional structure of the gas passage grooves.
Figure 7B:
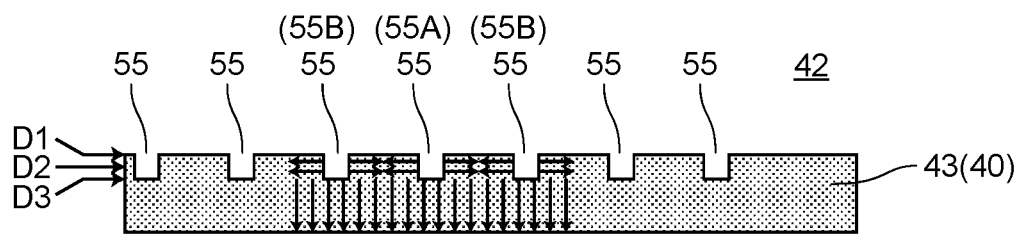

FIG. 6 is a view of a planar structure of gas passage grooves 55. FIGS. 7A and 7B are views of the planar structure and a cross-sectional structure of the gas passage grooves 55. FIG. 7A is a plan view. FIG. 7B is a cross-sectional view taken along line A-A of FIG. 7A. FIGS. 8A-8C are views showing planar structures of the gas passage grooves 55 at different depth positions. FIG. 8A shows a planar structure of the gas passage grooves 55 at a depth position D1 (a depth position at a surface of the porous body layer 40 (or the gas passage grooves 55)). FIG. 8B shows a planar structure of the gas passage grooves 55 at a depth position D2 (½ depth position of the gas passage grooves 55). FIG. 8C shows a planar structure of gas passage grooves 55 at a depth position D3 (a depth position at the bottom of the gas passage grooves 55).

In FIG. 6 and FIGS. 7A-7B, reference symbol 55 denotes the gas passage groove, reference symbol 55A denotes one gas passage groove of the gas passage grooves 55, and reference symbol 55B denotes a gas passage groove adjacent to the one gas passage groove 55A. The one gas passage groove 55A may be referred to as the gas passage groove 55 (55A) because the one gas passage groove 55A is also the gas passage groove 55. The gas passage groove 55B adjacent to the one gas passage groove 55A may be referred to as the gas passage groove 55 (55B) because it is also the gas passage groove 55. In FIG. 6, a region surrounded by thick solid line is a first rectangular region R1, regions surrounded by left and right thick broken lines of the first rectangular region R1 are second rectangular regions R2, and regions where the first rectangular region R1 and the second rectangular region R2 overlap are overlapping regions R3. The overlapping region R3 is shown in dark color. Reference symbol R denotes a rectangular region circumscribed by each gas passage groove of the plurality of gas passage grooves 55. Reference symbol R1 denotes the first rectangular region circumscribed by the one gas passage groove 55A of the rectangular regions. Reference symbol R2 denotes the second rectangular region circumscribed by the gas passage groove 55B adjacent to the one gas passage groove 55A. Reference symbol R3 denotes the overlapping region in which the first rectangular region R1 and the second rectangular region R2 overlap. The first rectangular region R1 may be referred to as the first rectangular region R (R1) because the first rectangular region R1 is also the rectangular region R. The second rectangular region R2 may be referred to as the second rectangular region R (R2) because the second rectangular region R2 is also the rectangular region R. In FIG. 7A, reference symbol L2 denotes an arrangement pitch of the gas passage grooves 55.

In FIGS. 7A-7B and FIGS. 8A-8C, flow of the cathode gas is illustrated. In FIG. 7A and FIGS. 8A-8C, an arrow in the gas passage groove 55 is flow along the gas passage groove 55, and a longitudinally upward arrow marked in the porous body layer 40 is flow (infiltration gas flow) of the cathode gas extruded from the gas passage groove 55 into the porous body layer 40 (a gas diffusion layer 43). In FIG. 7B, lateral and downward (directions toward the membrane electrode assembly side) arrows marked in the porous body layer 40 show flows of the cathode gas extruded from the gas passage groove 55 into the porous body layer 40 (the gas diffusion layer 43). FIGS. 9A-9C are views showing relationships among the first rectangular region R1, the second rectangular region R2, and the overlapping region R3.

As shown in FIG. 4 and FIGS. 5A-5B, the fuel cell separator 23 has a structure in which the fuel cell gas supply and diffusion layer 42 is formed on one surface of the metal plate 30. In FIGS. 5A-5B, the metal plate 30 is hatched to show that it is a cross-section. The metal plate 30 is a metal plating material or a cladding material which preferably made from one or more of inconel, nickel, gold, silver and platinum, or made of austenitic stainless steel sheet. By using these metals, a corrosion resistance can be improved.

At a longitudinal one end portion of the metal plate 30 in the fuel cell separator 23 (lower portion of FIG. 4), in the order of right, center, left in FIG. 4, the cathode gas inflow port 62A, the cooling water inflow port 63A and the anode gas outflow port 61B is provided. Further, at the other end portion in the fuel cell separator 23 (upper portion in FIG. 4), in the order of left, center, right in FIG. 4, the cathode gas outflow port 62B and the cooling water outflow port 63B and the anode gas inflow port 61A are provided.

Each inflow port 61A, 62A, 63A, each outflow port 61B, 62B, 63B, and a forming region of the fuel cell gas supply and diffusion layer 42 are surrounded by a dense frame 32 which has electronically conductive or non-electronically conductive. The dense frame 32 prevents leakage of the anode gas, the cathode gas and the cooling water. In an outer surface of the dense frame 32, a groove 33A (not shown in FIG. 4) is formed along the dense frame 32 so as to surround each inflow port 61A, 62A, 63A, each outflow port 61B, 62B, 63B, and the forming region of the fuel cell gas supply and diffusion layer 42. A gasket (a sealing material such as a packing, a O-ring and so on) 33 is disposed in the groove 33A.

A corrosion resistant layer (not shown in FIGS. 5A and 5B) having electronic conductivity is formed on both surfaces of the metal plate 30 except for portions where each inflow port 61A, 62A, 63A and each outflow port 61B, 62B, 63B are provided. The corrosion resistant layer may be formed on the inner circumferential surface of each inflow port 61A, 62A, 63A and each outflow port 61B, 62B, 63B. The corrosion resistant layer may also be formed on a side surface and an end surface of the metal plate 30. The corrosion resistant layer is a dense layer which has the same composition as a composition of the dense frame 32 preferably and has the function of suppressing corrosion of the metal plate 30. In the stage of configuring a fuel cell stack as shown in FIG. 1 or FIG. 2 by combining fuel cell separators, the gasket 33 is in close contact with the other fuel cell separators to be joined, the membrane electrode assembly 81 or the current collector plates 27A, 27B to suppress leakage of fluid.

The fuel cell separator 23 is a type-C fuel cell separator. As shown in FIG. 4 and FIGS. 5A-5B, in the fuel cell separator 23, the fuel cell gas supply and diffusion layer 42 for supplying and diffusing the cathode gas is formed on a central portion in the one surface of the rectangular metal plate 30 as a substrate. The fuel cell gas supply and diffusion layer 42 includes the sheet-like porous body layer 40 which capable of gas permeating and gas diffusing and has conductivity, and the plurality of gas passage grooves 55 formed on one surface of the porous body layer 40 in parallel and formed in a zigzag shape or a wave shape from the inflow side to the outflow side of the gas, and the gas diffusion layer 43 which is a part of the porous body layer 40 other than the gas passage groove 55 (see FIG. 4).

And as viewed in plan view, in the plurality of rectangular regions R which circumscribes each gas passage groove 55 of the plurality of gas passage grooves 55, the first rectangular region R1 where circumscribes the one gas passage groove 55 and the second rectangular region R2 where circumscribes the gas passage groove adjacent to the one gas passage groove overlap along a region in contact each other. The overlapping region R3 where the first rectangular region R1 and the second rectangular region R2 overlap exists at any depth positions D1, D2, D3 of the plurality of gas passage grooves 55 regardless of the cross-sectional shape of the plurality of gas passage grooves 55 (see FIGS. 7A-7B and FIGS. 8A-8C).

In this specification, "a rectangular region" is a rectangular region R circumscribed by each gas passage groove in the plurality of gas passage grooves (see FIG. 6 and FIGS. 7A-7B). When one or a plurality of gas pressure equalizing grooves is formed in the porous body layer 40 over a entire width along a direction perpendicular to a direction from the inflow side to the outflow side of the gas so as to intersect the plurality of gas passage grooves (see FIG. 12 described later, for example), each rectangular region R formed in the region divided by the gas pressure equalizing groove is also included in a rectangular region of the present invention regardless of a difference in a width and/or a length thereof. In this specification, "a infiltration region" refers to a region of rectangular region excluding the gas passage groove 55. Within the infiltration region, much of the gas will flow along the shortest path towards the outflow side.

In this specification, "from the inflow side to the outflow side of the gas" means "approximately along a flow direction of the gas". The direction "from the inflow side to the outflow side of the gas" is a direction of flow of the gas in the porous body layer 40 when viewed as whole of the porous body layer 40. As in the fuel cell gas supply and diffusion layer 42 according to the embodiment, when the cathode gas inflow port 62A and the cathode gas outflow port 62B is disposed in a diagonal position of the metal plate 30, the gas flow path need not be formed along the above diagonal. As in the embodiment, the direction "from the inflow side to the outflow side of the gas" is "in case of the direction of the flow of the gas in the porous body layer 40 when viewed as whole of the porous body layer 40 is a direction along the vertical direction from the bottom to the top of the paper surface of FIG. 4", as shown in FIG. 4, the gas passage groove may be formed along to the vertical direction from the bottom to the top of the paper surface of FIG. 4. The gas passage groove may be formed along other directions. The gas pressure equalizing groove may be disposed in a direction of "from the inflow side to the outflow side of gas", that is, in a direction substantially perpendicular to the direction of the gas flow in the porous body layer 40 when viewed as whole of the porous body layer 40.

In the embodiment, a rectangular region circumscribed by the gas passage groove 55 for each gas passage groove 55 of the plurality of gas passage grooves 55 formed in the portions sandwiched between the gas inflow side groove 51, the gas outflow side groove 52, or the gas pressure equalizing groove 56 and in communication with two of the end portion of the porous body layer 40, the gas inflow side groove 51, the gas outflow side groove 52, and the gas pressure equalizing groove 56 which the end portion of the porous body layer 40 or the groove are adjacent to each other (in other words, formed between the porous body layer 40 or the grooves 51, 52, 56 which are adjacent to each other in the end portion of the plurality of grooves 51, 52, 56 and the end portion of the porous body layer 40, and in communication with the end portion of the porous body layer 40 or the grooves 51, 52, 56 which are adjacent to each other) and arranged in parallel is rectangular region R. Therefore, according to configuration of "the first rectangular region R1 and the second rectangular region R2 overlap along the region in contact each other" as described above, that is, an arrangement pitch L2 of the gas passage grooves (the rectangular region R) and a width L of the rectangular region R (the first rectangular region R1 and the second rectangular region R2) satisfy the relation of L2<L as shown in FIG. 9A, the arrangement is configured such that the other peak side of the adjacent zigzag shaped gas passage groove 55 protrudes to one valley side such an extent that the flow paths do not overlap with each other. The end portion of the porous body layer 40 includes the vicinity of an end portion of the porous body layer 40.

In the fuel cell gas supply and diffusion layer 42 according to the embodiment, it is preferable that the width L1 of the overlapping region R3 and the width L of the rectangular region R (the first rectangular region R1 and the second rectangular region R2) satisfy a relationship of "L1≥0.1×L", more preferable that the width L1 and the width L satisfy a relationship of "L1≥0.2×L", even more preferable that the width L1 and the width L satisfy a relationship of "L1≥0.3× L" (see FIGS. 7A and 7B).

The Air (oxygen gas and nitrogen gas) as the cathode gas diffuses in the porous body layer 40 (the gas diffusion layer 43). The porous body layer 40 includes a mixture of a conductive material (preferably a carbon-based conductive material) and a polymer resin. By mixing the carbon-based conductive material into the polymer resin, high conductivity can be imparted to the polymer resin, and moldability of the carbon material can be improved by binding property of the polymer resin. A fluid resistance of the porous body layer 40 depends on porosity of the porous body layer and an area of a fluid flow surface. The larger the porosity, the smaller the fluid resistance. The larger the area of the fluid flow surface, the smaller the fluid resistance. As a rough guide, in the fuel cell gas supply and diffusion layer 42 (for the cathode gases), porosity of the porous body layer 40 is about 50-85%. In the fuel cell gas supply and diffusion layer 41 (for the anode gas), porosity of the porous body layer 40 is about 30-85%.

Since the porosity of the porous body layer 40 is configured as described above, the flow of the cathode gas, water vapor, and condensed water between the gas passage groove 55 and the porous body layer 40 is appropriately performed through an inner surface of the gas passage groove 55. Consequently, it becomes possible a large amount of the fuel cell gas can be uniformly supplied to the membrane electrode assembly, and, the cathode gas not used during power generation, and the water vapor and the condensed water generated during power generation to be efficiently discharged to the outside of the gas passage groove. Consequently, there is no need to form such as a gas permeating filter having a large number of fine gas flow holes in a gas impermeable layer made of metals, ceramics, resins, or the like on the inner surface of the gas passage groove 55.

By adjusting a content rate of the carbon-based conductive material, it is possible to adjust the porosity of the fuel cell gas supply and diffusion layer 42, it is possible to adjust the migration resistance of the fuel cell gas supply and diffusion layer 42. In particular, increasing the content rate of the carbon-based conductive material, the migration resistance is reduced (the porosity is increased). Conversely, the content rate of the carbon-based conductive material is lowered, the migration resistance is increased (the porosity is reduced). The corrosion resistant layer and the dense frame 32 are also mixtures of the carbon-based conductive material and the polymer resin. It is preferable that the corrosion resistant layer and the dense frame 32 are densified while ensuring conductivity with an appropriate content of the carbon-based conductive material.

The carbon-based conductive material is not particularly limited, graphite, carbon black, diamond coated carbon black, silicon carbide, titanium carbide, carbon fibers, carbon nanotubes, and the like can be used, for example. As the polymer resin, any of a thermosetting resin and a thermoplastic resin can be used. Examples of the polymer resin include a phenolic resin, an epoxy resin, a melamine resin, a rubber-based resin, a furan resin, a vinylidene fluoride resin, and the like.

An inflow passage 57 is formed between the cathode gas inflow port 62A and a region where the porous body layer 40 is formed (see FIG. 4). An outflow passage 58 is formed between the cathode gas outflow port 62B and a region where the porous body layer 40 is formed. The inflow passage 57 and the outflow passage 58 support the membrane electrode assembly 81 or a frame 81A of the membrane electrode assembly 81. Therefore, the inflow passage 57 and the outflow passage 58 may have any structures capable of smoothly flowing the cathode gas and supporting the membrane electrode assembly 81. The structure may be, for example, a porous layer having a very large porosity, or a structure in which a large number of struts are arranged. In a region facing the inflow passage 57 in the porous body layer 40, an elongated inflow side groove 51 is formed along a widthwise direction of the metal plate 30. Also in a region facing the outflow passage 58 in the porous body layer 40, an elongated outflow side groove 52 is formed along a widthwise direction of the metal plate 30. The formation of the inflow side groove 51 and the outflow side groove 52 may be omitted.

As shown in FIGS. 5A and 5B, the porous body layer 40, the inflow passage 57, and the outflow passage 58 are formed at the same height (thickness) as the dense frame 32. On the surface of the side facing the metal plate 30 in the fuel cell gas supply and diffusion layer 42, the plurality of gas passage grooves 55 made of gaps is provided. The gaps between the plurality of gas passage grooves 55 and the metal plate 30, the plurality of gas flow paths is formed. The gas passage groove 55 is a plurality formed with predetermined gaps. Each gas passage groove 55 communicates with the inflow passage 57 through the inflow side groove 51 at the inflow side, and communicates with the outflow passage 58 through the outflow side groove 52 at the outflow side. The numbers and construction of the gas passage groove 55 are not limited to those shown.

When the fuel cell gas supply and diffusion layer 42 according to the embodiment is used for a fuel cell for a transportation machine, a width of the porous body layer 40 is, for example, about 30 mm to 300 mm, depending on the type and size of the transportation machine. The width W of the gas passage groove 55 is, for example, about 0.3 mm to 2 mm. A thickness of the porous body layer 40 is, for example, about 150 to 400 µm, the depth of the gas passage groove 55 is, for example, about 100 to 300 µm, the distance between bottom of the gas passage groove and the other surface of the porous body layer 40 (ceiling thickness) is about 100 to 300 µm, for example. When the fuel cell gas supply and diffusion layer 42 according to the embodiment is used for a fuel cell for applications other than transportation machines (for example, stationary applications), it is not limited to the above described sizes. In this case, an appropriate size can be used in accordance with a required performance or the like. As shown in FIG. 4, the gas passage groove 55 is zigzag shaped. That is, the gas passage groove 55 has a straight portion 551 and a corner portion 552 for changing a flow direction of the air. The length of the straight portion 551 and the angle of the corner portion 552 are not limited to those shown in FIG. 4. For example, the angle of the corner portion 552 in FIG. 4 is substantially perpendicular. However, the angle of the corner 552 may be an acute angle or an obtuse angle. Further, the corner portion 552 may be subjected to an appropriate chamfering process or a rounding process.

As shown in FIG. 4, in the fuel cell gas supply and diffusion layer 42 according to the embodiment, the length of each straight portion 551 and the shapes of each corner portion 552 are equal to each other. Then, as described above, when viewing the fuel cell gas supply and diffusion layer 42 in the plan view, when defining the plurality of rectangular region (oblong region) R circumscribed by each gas passage groove of the plurality of gas passage groove 55, the first rectangular region R1 the one gas passage groove 55 circumscribes and the second rectangular region R2 adjacent to the gas passage groove of the one gas passage groove 55 is circumscribed overlap along the region of the contact (see FIG. 6). In the fuel cell gas supply and diffusion layer 42, the overlapping region R3 in which the first rectangular region R1 and the second rectangular region R2 overlap exists at any of the depth positions D1, D2, D3 of the plurality of gas passage grooves 55 (see FIGS. 7A-7B and FIGS. 8A-8C).

The fuel cell gas supply and diffusion layer 41 of the type-A fuel cell separator 22 also has essentially the same configuration as the fuel cell gas supply and diffusion layer 42. However, since the gas supplied to the fuel cell gas supply and diffusion layer 41 is the hydrogen gas, the fuel cell gas supply and diffusion layer 41 has lower porosity and a smaller thickness than the fuel cell gas supply and diffusion layer 42 (see FIG. 10B to be described later).

In the type-CA fuel cell separator 21, as a fuel cell gas supply and diffusion layer, using the fuel cell gas supply and diffusion layer 41 and the fuel cell gas supply and diffusion layer 42 (see FIG. 10A to be described later). In the type-CW fuel cell separator 24, the cooling water supply and diffusion layer is formed on a surface on which the fuel cell gas supply and diffusion layer 42 is not formed in the type-C fuel cell separator 23 (see FIG. 10C to be described later). In the type-AW fuel cell separator 25, the cooling water supply and diffusion layer is formed on a surface on which the fuel cell gas supply and diffusion layer 41 is not formed in the type-A fuel cell separator 22 (see FIG. 10D to be described later).

When the fuel cell stack 20 are operated, protons ($H^+$) are generated at a fuel electrode to which the anode gas (the hydrogen gas) is introduced. The protons diffuse in the membrane electrode assembly 81 and migrate to a oxygen electrode side, and react with oxygen to produce water. The generated water is discharged from the oxygen electrode side. At this time, in the fuel cell separator 23 provided with the fuel cell gas supply and diffusion layer 42 having the above described structure, the air flowing from the cathode gas inflow port 62A flows into the gas passage groove 55 through the inflow passage 57 and the inflow side groove 51. A portion of the air that has flowed into the inflow side groove 51 enters the gas passage grooves 55 and enters the porous body layer 40 (the gas diffusion layer 43) from the gas passage grooves 55. The other portion of the air flowing into the inflow side groove 51 enters the porous body layer 40 (the gas diffusion layer 43) directly from the end face of the porous body layer 40 (the gas diffusion layer 43) and diffuses in the porous body layer 40 (the gas diffusion layer 43).

The air also diffuses in a thickness direction while diffusing in the porous body layer 40 (the gas diffusion layer 43) in a planar direction. The air is supplied to the membrane electrode assembly 81 provided in contact with the porous body layer 40 (the gas diffusion layer 43) and contributes to power generation. The gases not used in power generation (unused oxygen gas and nitrogen gas) and the water (water vapor or condensed water) produced during power generation flow through the porous body layer 40 (the gas diffusion layer 43), the gas passage grooves 55 and the outflow side groove 52 into the outflow passage 58. The oxygen gas, the nitrogen gas, and the water flowing out to the outflow passage 58 are finally discharged from the outflow passage 58 through the cathode gas outflow port 62B and the cathode gas outflow port 72B. In this time, all the water is not discharged due to the structure of the fuel cell gas supply and diffusion layer 42. Some of the water remains in the porous body layer 40 (the gas diffusion layer 43).

The fuel cell gas supply and diffusion layer 42 according to the embodiment has the features as described above. Therefore, according to the fuel cell gas supply and diffusion layer 42, the water (the water vapor or the condensed water) generated by the membrane electrode assembly during power generation can be efficiently discharged to the outside of the gas passage groove through the porous body layer 40 and the gas passage grooves 55. Further, according to the fuel cell gas supply and diffusion layer 42, in the infiltration region, in a manner in which the water is extruded into the infiltration gas flow, so that the water can be efficiently discharged to the outside of the gas passage groove.

Effects of the Embodiment

In the fuel cell gas supply and diffusion layer 42 according to the embodiment, the plurality of gas passage grooves 55 is formed on one surface of the porous body layer 40. Therefore, according to the fuel cell gas supply and diffusion layer 42, the migration resistance of the fuel cell gas is reduced compared to conventional one, it is possible to supply a large amount of the fuel cell gas to the membrane electrode assembly compared to the conventional one.

Further, in the fuel cell gas supply and diffusion layer 42 according to the embodiment, the plurality of gas passage grooves 55 is formed on one surface of the porous body layers 40. Therefore, according to the fuel cell gas supply and diffusion layer 42, the fuel cell gas is always supplied to the membrane electrode assembly 81 disposed on the other surface of the porous body layer 40 through the porous body layer 40, and the fuel cell gas can be supplied more uniformly to the membrane electrode assembly than when a plurality of gas flow paths is opened from one surface of the porous body layer to the other surface of the porous body layer. Further, in the fuel cell gas supply and diffusion layer 42 according to the embodiment, the plurality of gas passage grooves 55 is formed on one surface of the porous body layer 40 in a zigzag shape or a wave shape from the inflow side to the outflow side of the gas. Therefore, according to the fuel cell gas supply and diffusion layer 42, the gas flow flowing in a shortcut and infiltrating between the upstream side flow passage and the downstream side flow passage (the infiltration gas flow) is formed not limited to the gas flow in the gas passage groove. Therefore, since supply paths of the fuel cell gas supplied to the porous layer are widely dispersed in a plane, than when the plurality of gas passage grooves is formed in a straight line from the inflow side to the outflow side of the gas, the fuel cell gas can be uniformly supplied to the membrane electrode assembly.

Further, in the fuel cell gas supply and diffusion layer 42 according to the embodiment, in the first rectangular region R1 where circumscribes the one gas passage groove 55A of the plurality of gas passage grooves 55, part of the fuel cell gas flowing in the one gas passage groove 55A enters the porous body layer 40, and the so-called infiltration region is formed in the first rectangular region R1. In the fuel cell gas supply and diffusion layer 42, part of the fuel cell gas flowing in the gas passage groove 55B adjacent to the gas passage groove 55A enters the porous body layer 40, and the so-called infiltration region is formed in the second rectangular region R2. In the fuel cell gas supply and diffusion layer 42, the first rectangular region R1 and the second rectangular region R2 overlap with each other along the contact region (see FIG. 6 and FIGS. 7A-7B). Therefore, according to the fuel cell gas supply and diffusion layer 42, since the supply path of the fuel cell gas supplied to the porous body layer 40 is so dispersed without gaps in the plane, the fuel cell gas can be more even uniformly supplied to the membrane electrode assembly 81.

Further, in the fuel cell gas supply and diffusion layer 42 according to the embodiment, overlapping region R3 in which the first rectangular region R1 and the second rectangular region R2 overlap exists at any depth position D1, D2, D3 of the plurality of gas passage grooves 55 (see FIGS. 7A-7B and FIGS. 8A-8C). Therefore, according to the fuel cell gas supply and diffusion layer 42, since the supply path of the fuel cell gas supplied to the porous body layer 40 is so dispersed without gaps in a plane at any depth position D1, D2, and D3 of the gas passage groove 55, the fuel cell gas can be even more uniformly supplied to the membrane electrode assembly.

Consequently, according to the fuel cell gas supply and diffusion layer 42 of the embodiment, a large amount of the fuel cell gas can be supplied uniformly to the membrane electrode assembly 81 compared to the conventional one, it is possible to increase the power generation efficiency of the fuel cell compared to the conventional one.

According to the fuel cell gas supply and diffusion layer 42 of the embodiment has the above described features, the fuel cell gas (in this case, the cathode gas (oxygen gas, nitrogen gas)) that was not used in the power generation can be efficiently discharged to the outside of the gas passage groove 55 through the porous body layer 40 and the gas passage groove 55. Further, according to the fuel cell gas supply and diffusion layer 42, the fuel cell gas (in this case, the cathode gas (the oxygen gas, the nitrogen gas)) which has not been used for the power generation in the form of being extruded into the infiltration gas flow in the infiltration region can be efficiently discharged outside of the gas passage groove 55. Therefore, According to the fuel cell gas supply and diffusion layer 42, the migration resistance of the fuel cell gas can be kept lower and reactant gas concentration can be kept higher than in the conventional one. For this reason, the fuel cell gas supply and diffusion layer 42 becomes a gas supply and diffusion layer which can increase the power generation efficiency of the fuel cell compared to the conventional one.

According to the fuel cell gas supply and diffusion layer 42 of the embodiment has the above described features, the water vapor or the condensed water generated in the membrane electrode assembly 81 during power generation can be efficiently discharged to the outside of the gas passage grooves 55 through the porous body layer 40 and the gas passage groove 55, and, the water vapor or the condensed water can be efficiently discharged to the outside of the gas passage grooves 55 in a manner extruded into the infiltration gas flow in the infiltration region. For this reason, the fuel cell gas supply and diffusion layer 42 becomes the fuel cell gas supply and diffusion layer which has superior drainability compared to the conventional one.

According to the fuel cell gas supply and diffusion layer 42 of the embodiment, the width L1 of the overlapping region R3 and the width L of the rectangular region satisfy the relation "L1≥0.1×L". Since the ratio of a planar area of the overlapping region R3 in the fuel cell gas supply and diffusion layer 42 can be increased, the fuel cell gas can be supplied more uniformly to the membrane electrode assembly 81.

According to the fuel cell separator 23 of the embodiment, the fuel cell separator 23 is a fuel cell separator including the metal plate 30 and the fuel cell gas supply and diffusion layer disposed on at least one surface of the metal plate 30. In the fuel cell separator 23, the fuel cell gas supply and diffusion layer is the fuel cell gas supply and diffusion layer 42 according to the embodiment. The fuel cell gas supply and diffusion layer 42 is disposed relative to the metal plate 30 such that the plurality of gas passage grooves 55 is located on the metal plate 30. In the fuel cell separator 23, the gas flow path is constituted of the gas passage grooves 55 and the metal plate 30. Therefore, according to the fuel cell separator 23, it is possible to increase the power generation efficiency of the fuel cell compared to the conventional one. Furthermore, according to the fuel cell separator 23, the fuel cell separator 23 becomes a fuel cell separator which has a superior drainability compared to the conventional one.

The fuel cell stack 20 according to the embodiment is a fuel cell stack formed by laminating the fuel cell separators and the membrane electrode assemblies. In the fuel cell stack 20, the fuel cell separator is the fuel cell separator 23 according to the embodiment, and the fuel cell separator 23 and the membrane electrode assembly 81 are laminated in a positional relationship where the membrane electrode assembly 81 is positioned on the surface where the plurality of gas passage grooves 55 is not formed in the fuel cell gas supply and diffusion layer 42. Therefore, according to the fuel cell stack 20, it is possible to increase the power generation efficiency of the fuel cell compared to the conventional one. Furthermore, according to the fuel cell stack 20, the fuel cell stack 20 becomes a fuel cell stack which has a superior drainability compared to the conventional one.

Production Method of the Fuel Cell Separator 23

For example, the corrosion resistant layer, the dense frame 32, the fuel cell gas supply and diffusion layer 42 and the like are formed by isotropic pressurization. For example, when the thermosetting resin (which may be the thermoplastic resin) is used, carbon-based conductive material powders (and, depending on circumstances, carbon fibers), resin powders and volatile solvent are kneaded into a paste form. Many kinds of pastes are prepared, such as those for the corrosion resistant layer and the dense frame, and those for the fluid supply and diffusion layer. Then, on the metal plate 30, a pattern of the corrosion resistant layer, a pattern of the dense frame 32, a pattern of the fuel cell gas supply and diffusion layer 42, and the like are printed, stamped, squeezed, or the like sequentially. For each formation of each pattern, the solvent is volatilized. After all patterns described above are foamed, entire of the metal plate 30 is placed into a soft and thin rubber bag and the rubber bag is degassed into a vacuum. Thereafter, the rubber bag is placed in a pressure resistant container, and then heating fluid is introduced into the container, and the resin is cured by isotropic pressurization with the heating fluid. In order to finally make the dense frame 32 and the fuel cell gas supply and diffusion layer 42 the same height (thickness), it is preferable to adjust a height (a thickness) of each frame, wall, layer or the like at the time of pattern fabrication depending on a degree of shrinkage during resin curing.

The fuel cell separator 23a can also be produced by a following production method. On one hand, the corrosion resistant layer is formed on the metal plate 30, on the other hand, the dense frame 32 and the fuel cell gas supply and diffusion layer 42 are formed, and finally these are bonded by thermocompression. In this case, the dense frame 32 may be created at the same time as the corrosion resistant layer on the metal plate 30. It is also possible to produce the fuel cell separator 23 by making corrosion resistant layer and the dense frame 32 on the metal plate 30 in a first step, then printing the paste of the fuel cell gas supply and diffusion layer 42 on the corrosion resistant layer of the metal plate 30 in a second step in succession and then drying the paste, and curing the paste in a roll press (a hot press).

Alternatively, a following production method can be used. First, carbon fibers (CF), a small amount of fine particles of graphite carbon black (GCB) and resin thermoplastic or thermosetting or fibrous material serving as a binder are kneaded and formed into a sheet shape. Next, when a green sheet state before curing, the inflow passage 57, the outflow passage 58, the inflow side groove 51, the outflow side groove 52 and the gas passage groove 55 are formed by pushing a stamp type having protrusions of shapes corresponding to the inflow passage 57, the outflow passage 58, the inflow side groove 51, the outflow side groove 52 and the gas passage groove 55 against the sheet. Finally, the green sheet is heat treated and bonded to the metal plate 30 on which the corrosion resistant layer is formed.

The migration resistance (or the fluid resistance) of the fuel cell gas supply and diffusion layer 42 depends on a porosity of the porous body layer 40 and an area of a surface perpendicular to a direction of fluid flows (a height (a thickness) and a width of each layer). The larger the porosity, the smaller the migration resistance. The larger the area where the fluid flows, the smaller the migration resistance (the migration resistance per unit area is constant). As a rough guide, the porosity of the fuel cell gas supply and diffusion layer is about 30 to 85% for the fuel cell gas supply and diffusion layer 42 (for the anode gas) and about 50 to 85% for the fuel cell gas supply and diffusion layer 41 (for the cathode gas). The porosity P is determined by the following equation which is easy to measure: P=(volume of pores in the porous body layer)/(volume of the porous body layer). Here, the pores are true pores including pores that do not communicate with the outside.

The production methods described above can also be applied in production of a fuel cell separator other than the fuel cell separator 23 (the fuel cell separator 21, the fuel cell separator 22, the fuel cell separator 24 and the fuel cell separator 25).

The Fuel Cell Separators Other than the Fuel Cell Separator 23

FIGS. 10A-10B are cross-sectional views of the fuel cell separators other than the fuel cell separator 23 (the fuel cell separator 21, the fuel cell separator 22, the fuel cell separator 24 and the fuel cell separator 25). FIG. 10A is a cross-sectional view of the fuel cell separator 21 of type-CA. FIG. 10B is a cross-sectional view of the fuel cell separator 22 of type-A. FIG. 10C is a cross-sectional view of the fuel cell separator 24 of type-CW. FIG. 10D is a cross-sectional view of the fuel cell separator 25 of type-AW.

The fuel cell gas supply and diffusion layer of the present invention can be applied to the fuel cell gas supply and diffusion layer 42 (for the cathode gas) and/or the fuel cell gas supply and diffusion layer 41 (for the anode gas) of the fuel cell separator 21 (see FIG. 10A). The fuel cell gas supply and diffusion layer of the present invention can be applied to the fuel cell gas supply and diffusion layer 41 (for the anode gas) of the fuel cell separator 22 (see FIG. 10B). The fuel cell gas supply and diffusion layer of the present invention can be applied to the fuel cell gas supply and diffusion layer 42 (for the cathode gas) of the fuel cell separator 24 (see FIG. 10C). The fuel cell gas supply and diffusion layer of the present invention can be applied to the fuel cell gas supply and diffusion layer 41 (for the anode gas) of the fuel cell separator 25 (see FIG. 10D).

Even when the fuel cell gas supply and diffusion layer of the present invention is applied to the fuel cell gas supply and diffusion layer of the fuel cell separators 21, 22, 24, 25 as described above, it is possible to supply a large amount of the fuel cell gas to the membrane electrode assembly compared to a conventional one, and it is possible to increase a power generation efficiency of a fuel cell compared to the conventional one.

Modification 1

Figure 11:
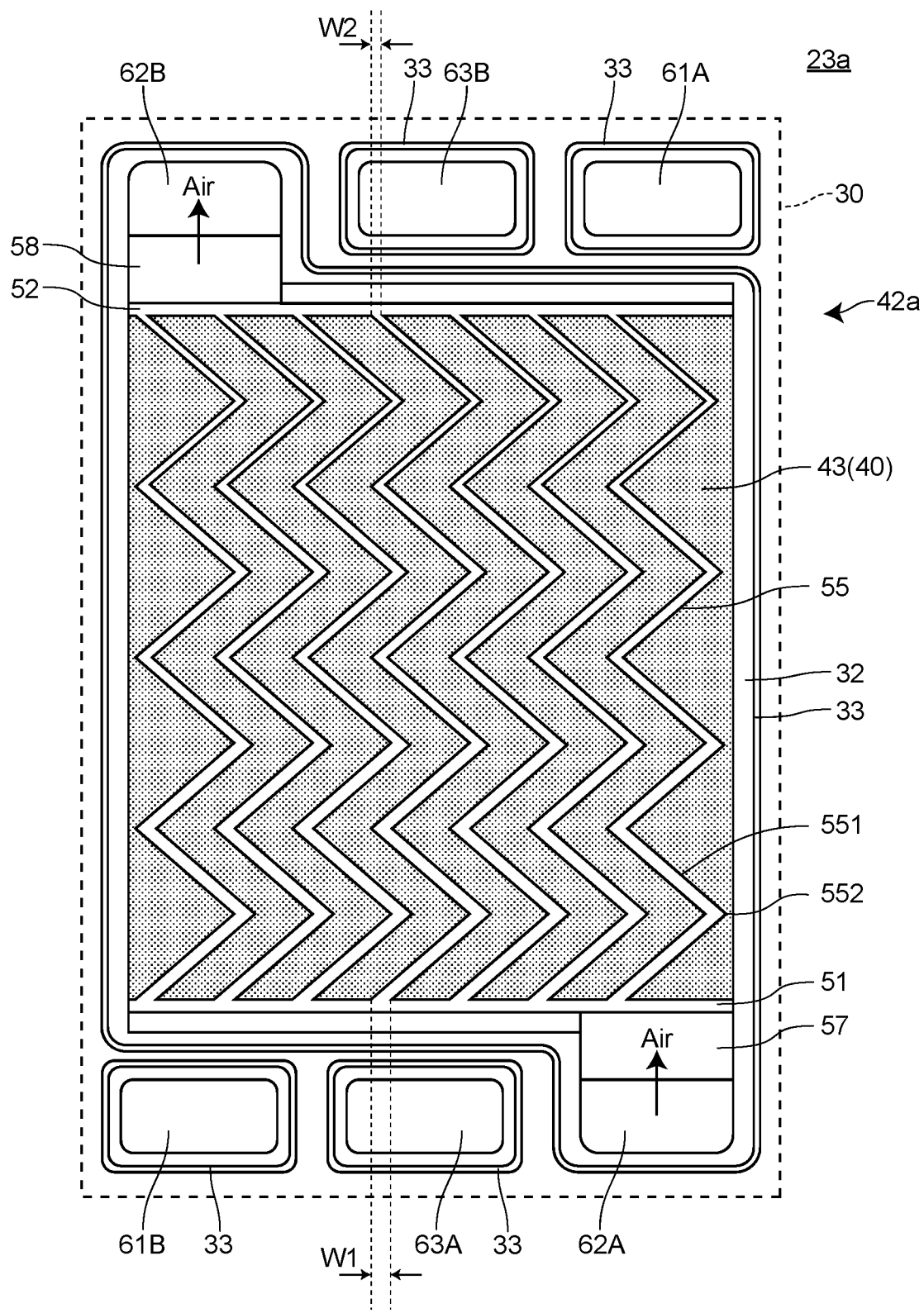
FIG. 11 is a plan view of a fuel cell gas supply and diffusion layer 42a according to a modification 1.

FIG. 11 is a view for explaining a planar structure (as viewed from the side of the metal plate 30) of the fuel cell gas supply and diffusion layer 42a according to modification 1. In order to represent a flow path pattern of the fuel cell separator 23 clearly, showing of the metal plate 30 is omitted in FIG. 11 as in the case of FIG. 4. The same applies to the subsequent FIG. 12 to FIG. 21. The fuel cell gas supply and diffusion layer 42a according to the modification 1 basically has the same configuration as the fuel cell gas supply and diffusion layer 42 according to the embodiment. However, in the fuel cell gas supply and diffusion layer 42a, the gas passage groove 55 differs from that of the fuel cell gas supply and diffusion layer 42 according to the embodiment. That is, in the fuel cell gas supply and diffusion layer 42a according to the modification 1, as shown in FIG. 11, the gas passage groove 55 has a configuration in which a width W1 of an inflow side end portion of the gas passage groove 55 and a width W2 of an outflow side end portion of the gas passage groove 55 satisfy a relation "W2<W1". In the fuel cell gas supply and diffusion layer 42a of the modification 1, a linear velocity of the gas flow in the gas passage groove is increased at the outflow end portion side. For this reason, according to the fuel cell gas supply and diffusion layer 42a, an infiltration rate of the gas in the porous body between the flow paths becomes high, and a larger amount of the fuel cell gas can be uniformly supplied into the porous body layer. Therefore, it is possible to suppress a decrease in the concentration of the fuel cell gas in the so-called infiltration region even in the outflow side region. Further, according to the fuel cell gas supply and diffusion layer 42a, the water vapor or the condensed water generated as reaction product and increasing toward the downstream side can be effectively discharged. A width W of the passage groove 55 is gradually narrowed from the inflow side to the outflow side of the gas.

Modification 2

Figure 12:
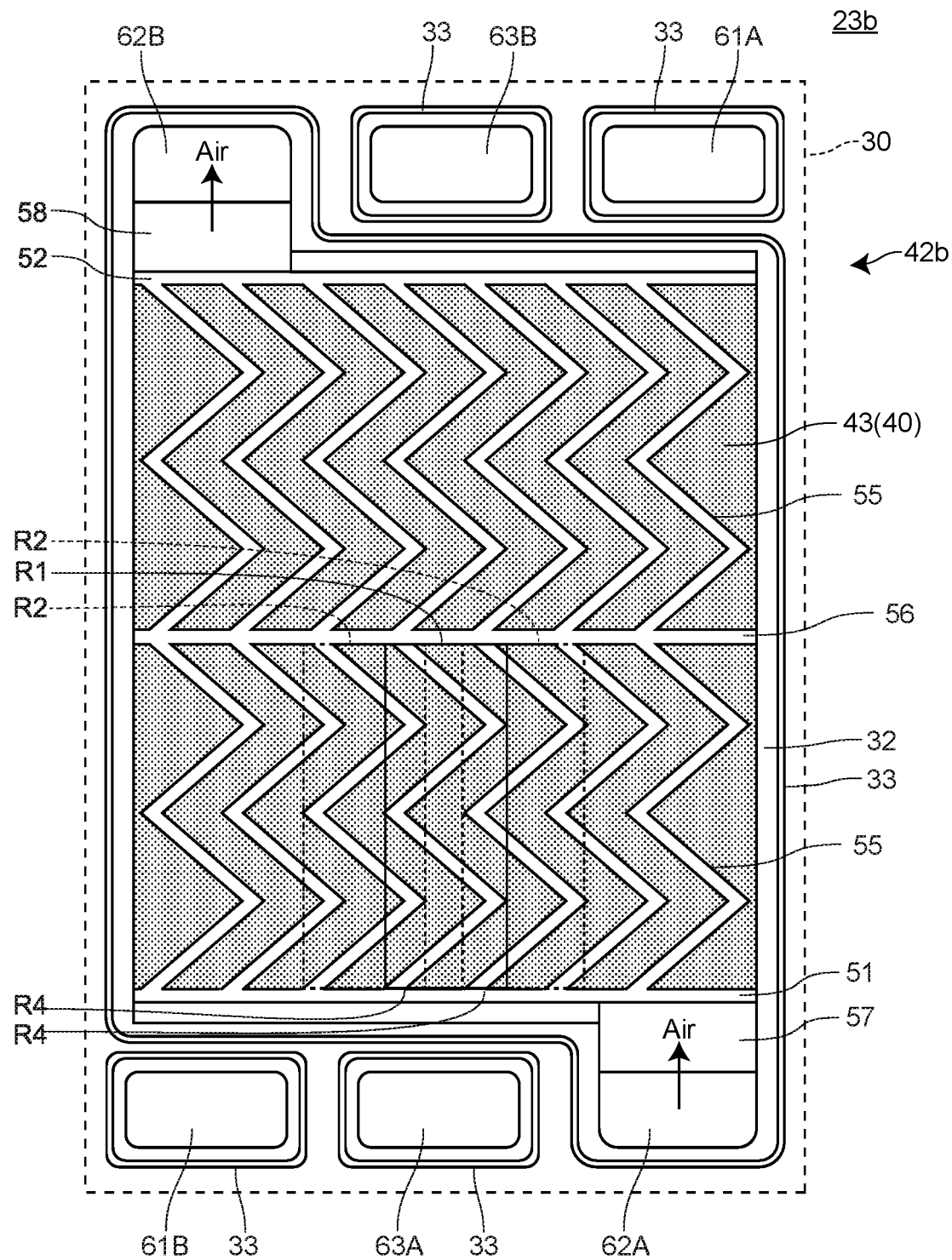
FIG. 12 is a plan view of a fuel cell gas supply and diffusion layer 42b according to a modification 2.

FIG. 12 is a view for explaining a planar configuration of a fuel cell gas supply and diffusion layer 42b according to a modification 2. In FIG. 12, reference symbol R4 denotes "a divided overlapping region" which is described later. The fuel cell gas supply and diffusion layer 42b according to the modification 2 basically has the same configuration as the fuel cell gas supply and diffusion layer 42 according to the embodiment. However, the fuel cell gas supply and diffusion layer 42b differs from the fuel cell gas supply and diffusion layer 42 according to the embodiment in that the gas pressure equalizing groove is formed in addition to the gas passage grooves. That is, in the fuel cell gas supply and diffusion layer 42b according to the modification 2, as shown in FIG. 12, a gas pressure equalizing groove 56 is formed on the porous body layer 40 over a entire width along a direction perpendicular to a direction from an inflow side to an outflow side of the gas so as to intersect the plurality of gas passage grooves 55. Assuming an overlapping region divided by the gas pressure equalizing groove 56 as "a divided overlapping region R4", the divided overlapping region R4 exists at any depth position of the plurality of gas passage grooves 55. According to the fuel cell gas supply and diffusion layer 42b of the modification 2, because of the effect of the gas pressure equalizing groove 56, it is possible to equalize the supply rate of the fuel cell gas over the entire width along the direction perpendicular to the direction from the inflow side to the outflow side of the gas. Further, since the divided overlapping region R4 exists at any depth position of the plurality of gas passage grooves, the supply paths of the fuel cell gas supplied to the porous layers are dispersed without gaps. Therefore, according to the fuel cell gas supply and diffusion layer 42b, the fuel cell gas can be even more uniformly supplied to the membrane electrode assembly.

In the fuel cell gas supply and diffusion layer 42b according to the modification 2, the depth of the gas passage groove 55 is equal to the depth of the gas pressure equalizing groove 56. Therefore, it is possible to form the gas passage groove 55 and the gas pressure equalizing groove 56 using the same production process and using a mold having a simple structure. For this reason, the fuel cell gas supply and diffusion layer 42b has the effect that it is possible to suppress an increase in manufacturing costs depending on forming the gas pressure equalizing groove.
Modification 3

Figure 13:
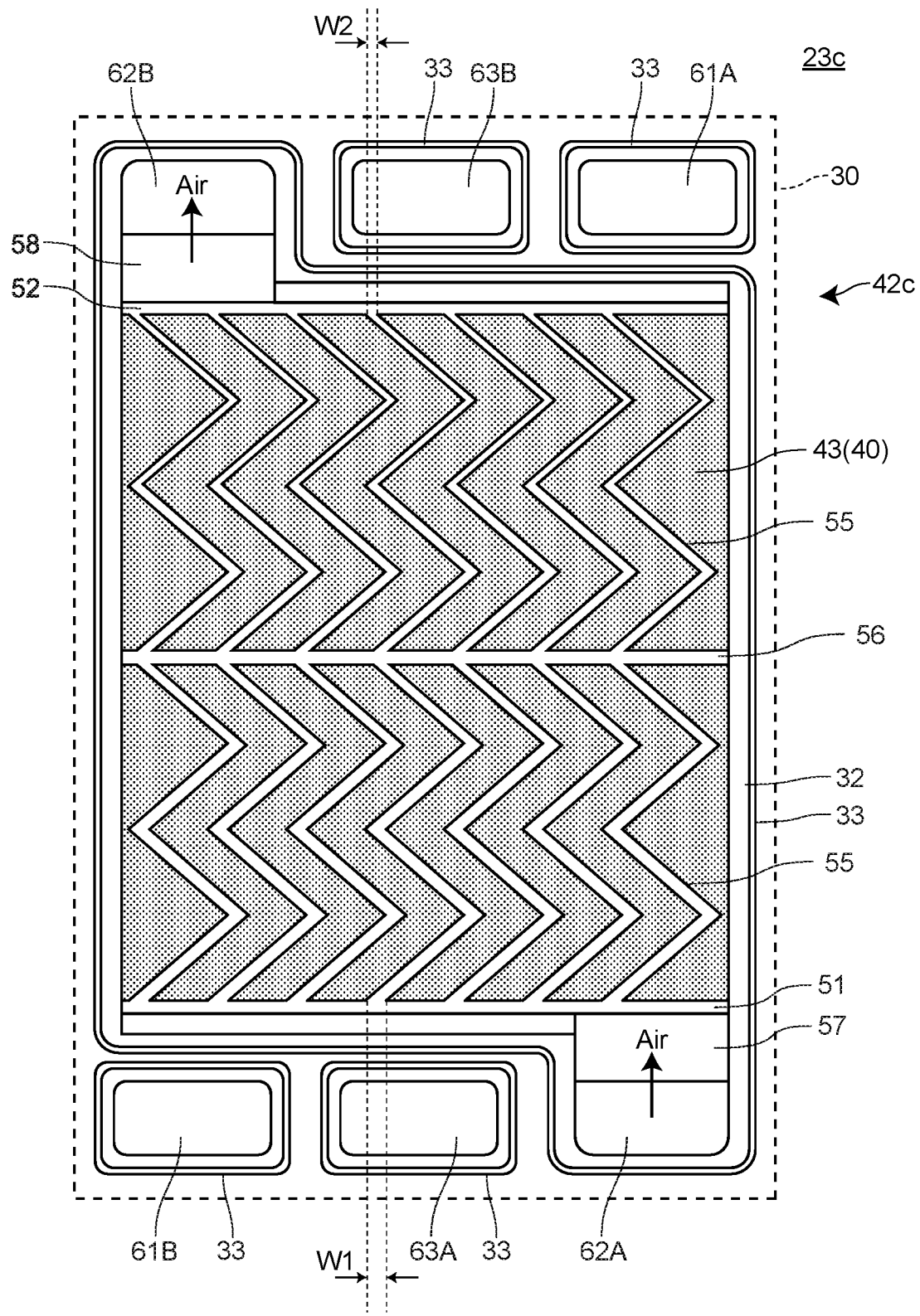
FIG. 13 is a plan view of a fuel cell gas supply and diffusion layer 42c according to a modification 3.

FIG. 13 is a view for explaining a planar structure of a fuel cell gas supply and diffusion layer 42c according to a modification 3. The fuel cell gas supply and diffusion layer 42c according to the modification 3 basically has the same configuration as the fuel cell gas supply and diffusion layer 42b according to the modification 2. However, in the fuel cell gas supply and diffusion layer 42c, the configuration of the gas passage groove 55 differs from that of the fuel cell gas supply and diffusion layer 42c according to the modification 2. That is, in the fuel cell gas supply and diffusion layer 42c according to the modification 3, as shown in FIG. 13, the gas passage groove 55 has a configuration in which the width W1 of the inflow side end portion of the gas passage groove 55 and the width W2 of the outflow side end portion of the gas passage groove 55 satisfy a relation "W2<W1". According to the fuel cell gas supply and diffusion layer 42c of the modification 3, linear velocity of the gas flow in the gas passage groove is increased at the outflow end portion side. For this reason, an infiltration rate of the gas in the porous body between the flow paths becomes high, and a larger amount of the fuel cell gas can be uniformly supplied into the porous body layer. Therefore, according to the fuel cell gas supply and diffusion layer 42c, it is possible to suppress a decrease in the concentration of the fuel cell gas in the so-called infiltration region even in the outflow side region. Further, according to the fuel cell gas supply and diffusion layer 42c, the water vapor or the condensed water generated as reaction product and increases toward the downstream side can be effectively discharged. A width W of the passage groove 55 is gradually narrowed from the inflow side to the outflow side of the gas. The width W of the passage groove 55 may be stepwisely narrowed.
Modification 4

Figure 14:
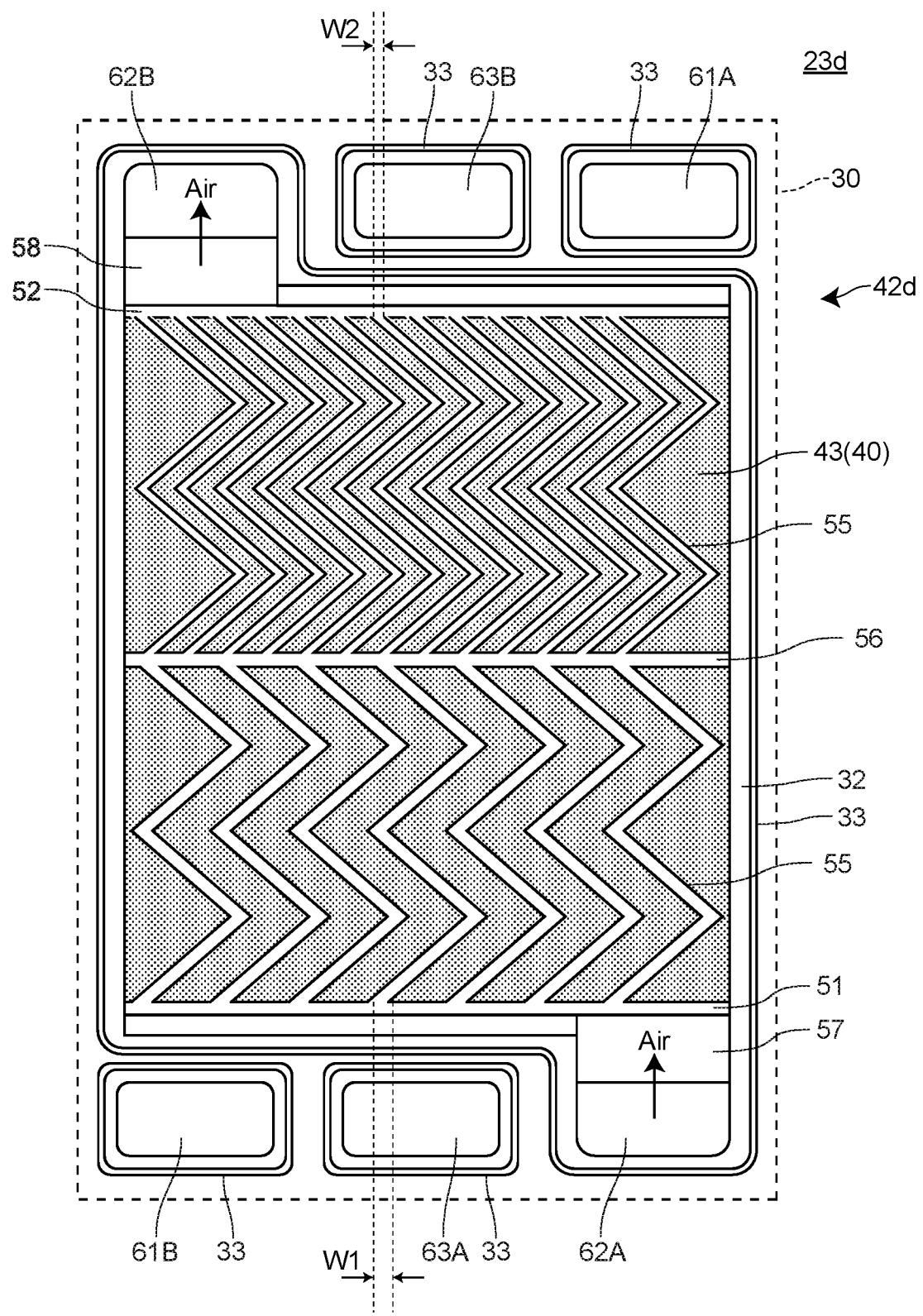
FIG. 14 is a plan view of a fuel cell gas supply and diffusion layer 42d according to a modification 4.

FIG. 14 is a view for explaining a planar structure of a fuel cell gas supply and diffusion layer 42d according to a modification 4. The fuel cell gas supply and diffusion layer 42d according to the modification 4 basically has the same configuration as the fuel cell gas supply and diffusion layer 42b according to the modification 2. However, in the fuel cell gas supply and diffusion layer 42d, a planar structure of the gas passage groove 55 differs from that of the fuel cell gas supply and diffusion layer 42b according to the modification 2. That is, the fuel cell gas supply and diffusion layer 42d according to the modification 4, as shown in FIG. 14, a formation density (number of forms per unit area) of the fuel cell gas passage groove 55 at the outflow side end portion is higher than a formation density (number of forms per unit area) of the gas passage groove 55 at the inflow side end portion. According to the fuel cell gas supply and diffusion layer 42d of the modification 4, even in the outflow side tends to supply is reduced to be consumed in accordance with the fuel cell gas flows toward the downstream with the progress of the reaction, the fuel cell gas concentration in the infiltration region it is possible to suppress a decrease in. Further, according to the fuel cell gas supply and diffusion layer 42d, the water vapor or the condensed water generated as reaction product and increases toward the downstream side can be effectively discharged.
Modification 5

Figure 15:
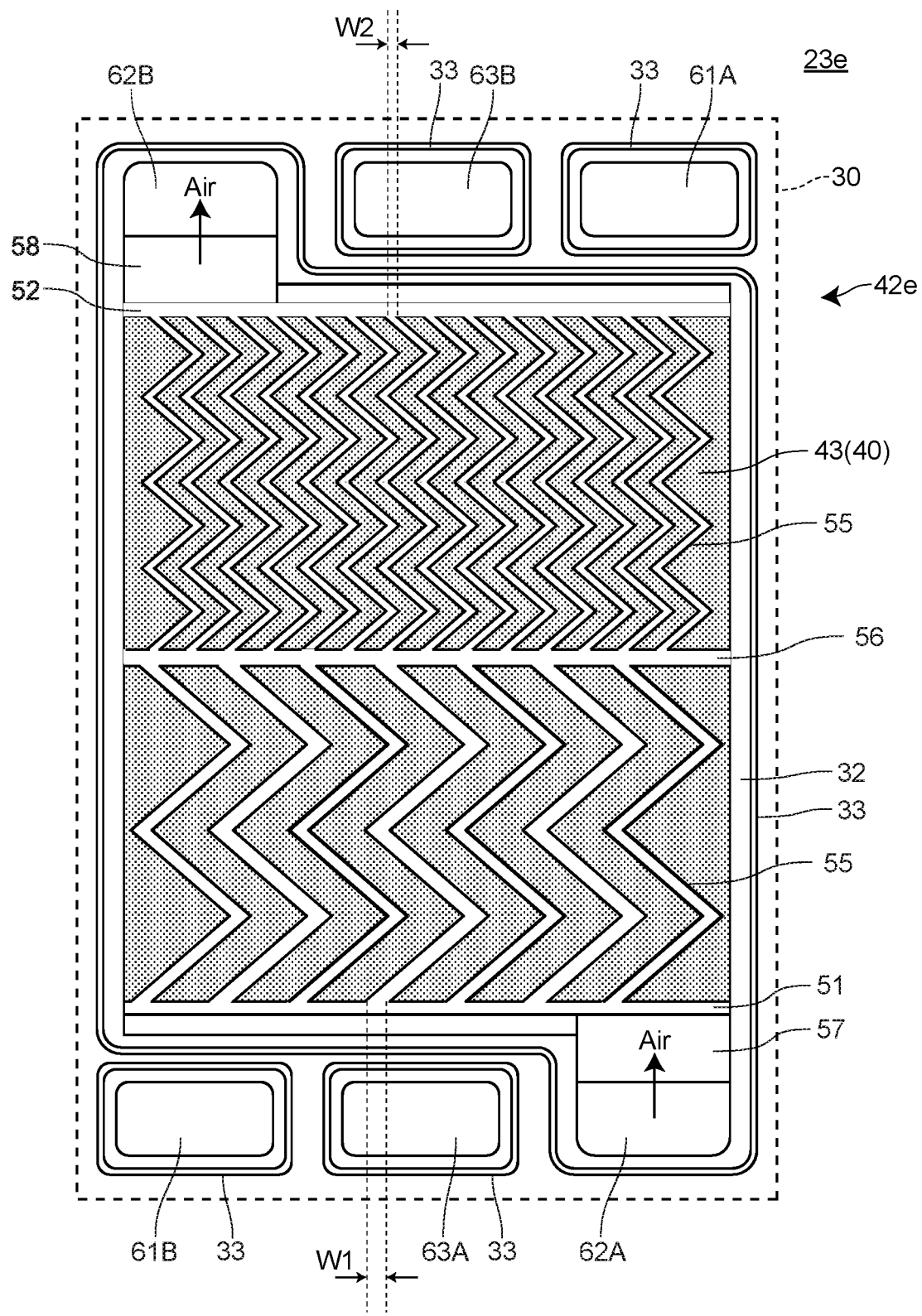
FIG. 15 is a plan view of a fuel cell gas supply and diffusion layer 42e according to a modification 5.

FIG. 15 is a view for explaining a planar structure of a fuel cell gas supply and diffusion layer 42e according to a modification 5. The fuel cell gas supply and diffusion layer 42e according to the modification 5 basically has the same configuration as the fuel cell gas supply and diffusion layer 42b according to the modification 2. However, in the fuel cell gas supply and diffusion layer 42e, a planar structure of the gas passage groove 55 differs from that of the fuel cell gas supply and diffusion layer 42b according to the modification 2. That is, in the fuel cell gas supply and diffusion layer 42e according to the modification 5, as shown in FIG. 15, as in the case of the modification 4, the formation density (the number of forms per unit area) of the gas passage groove 55 at the outflow side end portion is higher than the formation density (the number of forms per unit area) of the gas passage groove 55 at the inflow side end portion. According to the fuel cell gas supply and diffusion layer 42e of the modification 5, it is possible to suppress a decrease in the density of the fuel cell gas in the infiltration region even at the outflow side where the fuel cell gas tends to be consumed as the gas flows downward as the reaction progresses. Further, according to the fuel cell gas supply and diffusion layer 42e, the water vapor or the condensed water generated as a reaction product and increases toward the downstream side can be effectively discharged. In the modification 5, to shorten the longitudinal zigzag pitch of the gas passage groove 55 compared to the modification 4.
Modification 6

Figure 16:
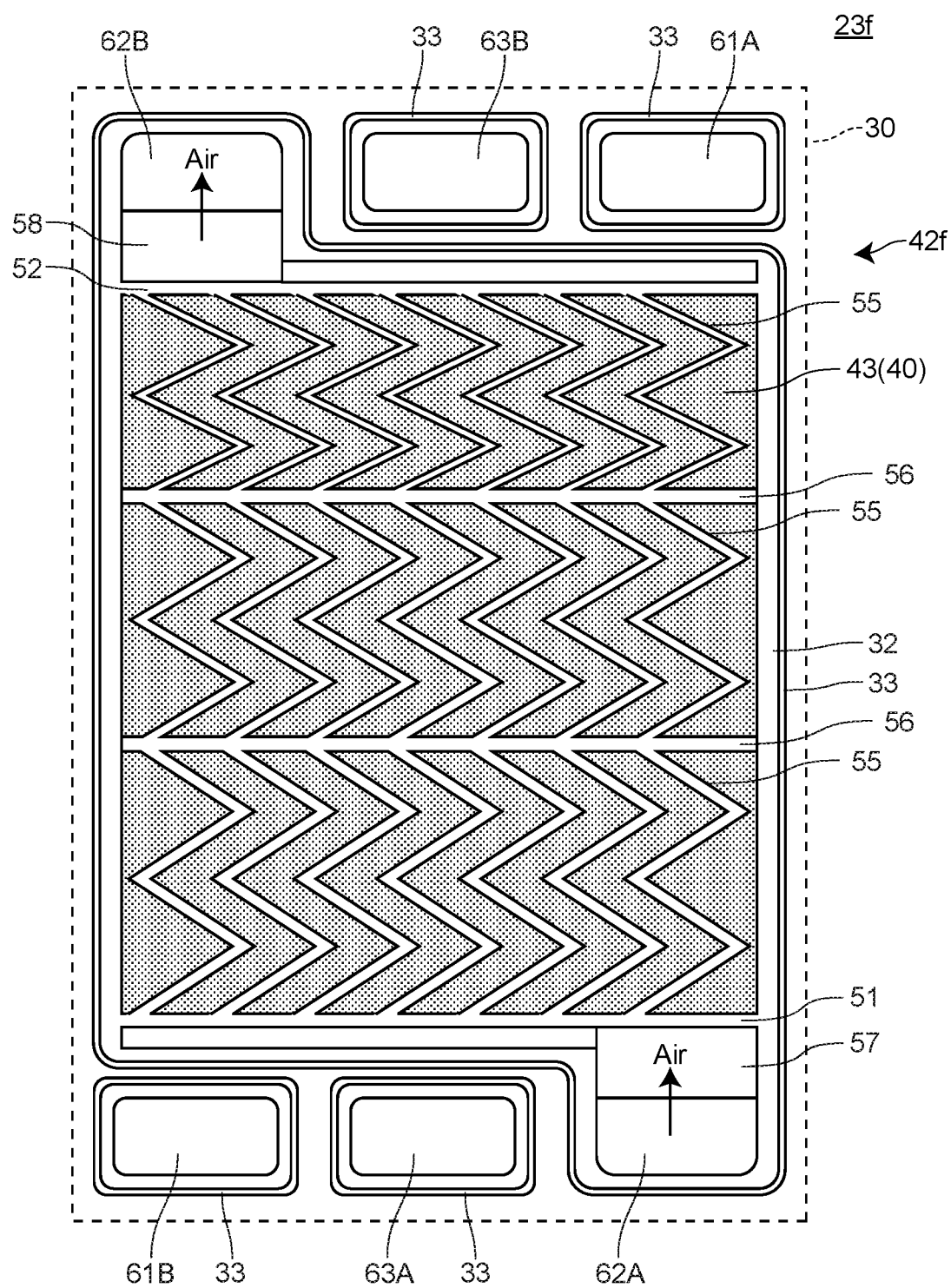
FIG. 16 is a plan view of a fuel cell gas supply and diffusion layer 42f according to a modification 6.

FIG. 16 is a view for explaining a planar structure of a fuel cell gas supply and diffusion layer 42f according to a modification 6. The fuel cell gas supply and diffusion layer 42f according to the modification 6 basically has the same configuration as the fuel cell gas supply and diffusion layers 42b to 42e according to the modifications 2 to 5. However, in the fuel cell gas supply and diffusion layer 42f, the number of the gas pressure equalizing groove 56 to be formed differs from that of the fuel cell gas supply and diffusion layers 42b to 42e according to the modifications 2 to 5. That is, in the fuel cell gas supply and diffusion layer 42f according to the modification 6, as shown in FIG. 16, the number of formed gas pressure equalizing grooves 56 is two. According to the fuel cell gas supply and diffusion layer 42f of the modification 6, since the number of the gas pressure equalizing grooves 56 formed is two, because of the effect of the gas pressure equalizing grooves 56, it is possible to more equalize the supply rate of the fuel cell gas over the entire width along the direction perpendicular to the direction from the inflow side to the outflow side of the gas. A width W of the passage groove 55 is stepwise narrowed from the inflow side to the outflow side of the gas, but the width W of the passage groove 55 may be gradually narrowed.

Modification 7

Figure 17:
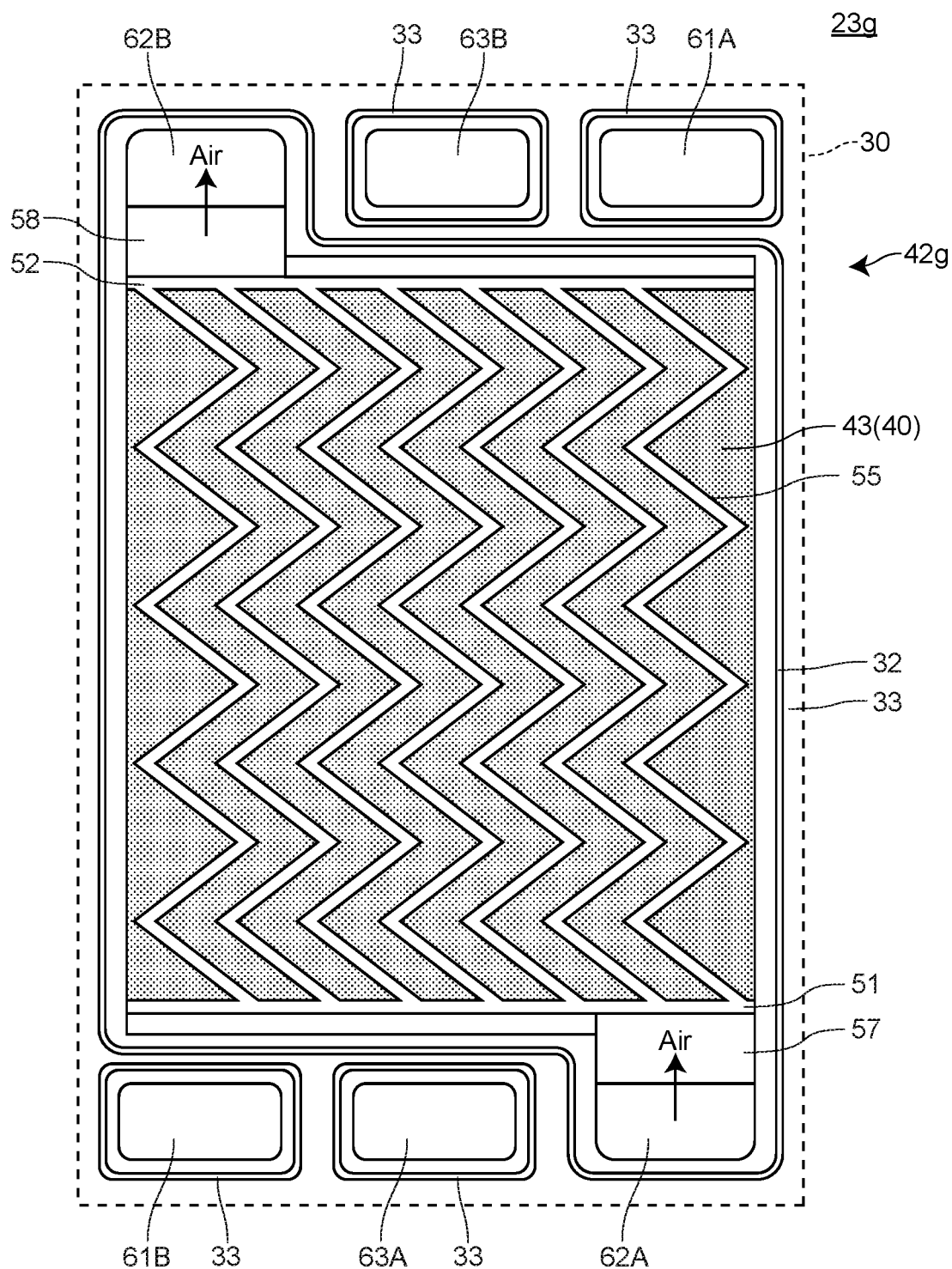
FIG. 17 is a plan view of a fuel cell gas supply and diffusion layer 42g according to a modification 7.

FIG. 17 is a view for explaining a planar configuration of a fuel cell gas supply and diffusion layer 42g according to a modification 7. The fuel cell gas supply and diffusion layer 42g according to the modification 7 basically has the same configuration as the fuel cell gas supply and diffusion layer 42 according to the embodiment. However, in the fuel cell gas supply and diffusion layer 42g, a forming angle of most inflow side gas passage grooves differ from that of the fuel cell gas supply and diffusion layer 42 according to the embodiment. That is, in the gas supply and diffusion layer 42g according to the modification 7, as shown in FIG. 17, the forming angle of the fuel cell gas passage groove 55 in the most inflow side is at an angle the fuel cell gas easily entering the gas passage groove 55. According to the fuel cell gas supply and diffusion layer 42g of the modification 7, because of the forming angle of the gas passage groove 55 in the most inflow side is at the angle the fuel cell gas easily entering the gas passage groove 55, the migration resistance of the fuel cell gas is reduced, and it is possible to supply even more large amount of the fuel cell gas to the membrane electrode assembly.

Modification 8

Figure 18:
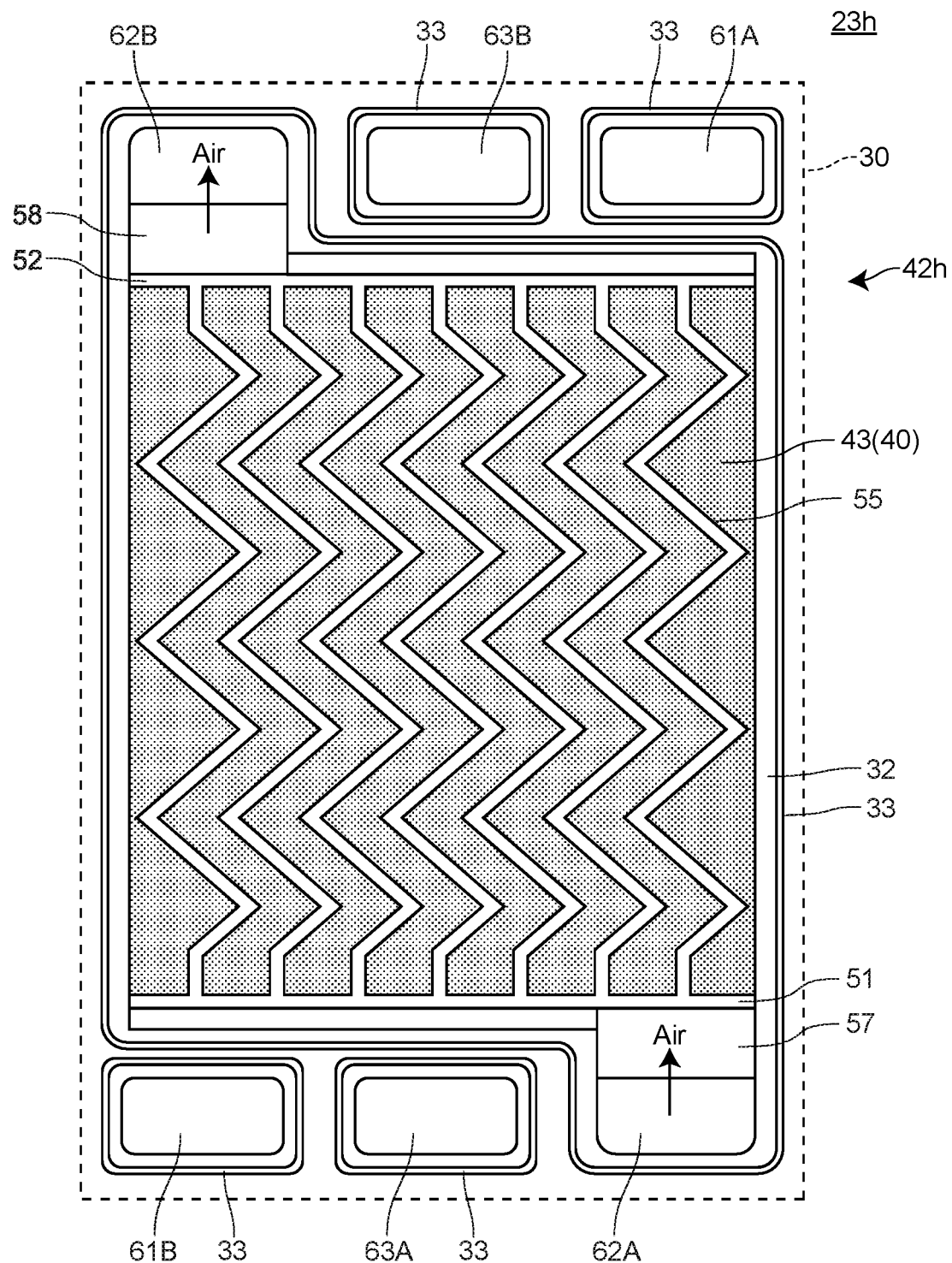
FIG. 18 is a plan view of a fuel cell gas supply and diffusion layer 42h according to a modification 8.

FIG. 18 is a view for explaining a planar structure of a fuel cell gas supply and diffusion layer 42h according to a modification 8. The fuel cell gas supply and diffusion layer 42h according to the modification 8 basically has the same configuration as the fuel cell gas supply and diffusion layer 42 according to the embodiment. However, in the fuel cell gas supply and diffusion layer 42h, a forming angle of the inflow side end portion and the outflow side end portion of the gas passage groove 55 differs from that of the fuel cell gas supply and diffusion layer 42 according to the embodiment. That is, in the fuel cell gas supply and diffusion layer 42h according to the modification 8, as shown in FIG. 18, both of the forming angles of the inflow side end portion and the outflow side end portion of the gas passage groove 55 are parallel to a direction along the outflow side from the inflow side of the gas (a longitudinal direction of the metal plate 30). According to the fuel cell gas supply and diffusion layer 42h of the modification 8, because of both of the forming angles of the inflow side end portion and the outflow side end portion of gas passage groove 55 are parallel to the direction along the outflow side from the inflow side of the gas (the longitudinal direction of the metal plate 30), a migration resistance at the time of inflow and outflow of the fuel cell gas is reduced, and it is possible to supply even more large amount of the fuel cell gas to the membrane electrode assembly.

Modification 9

Figure 19:
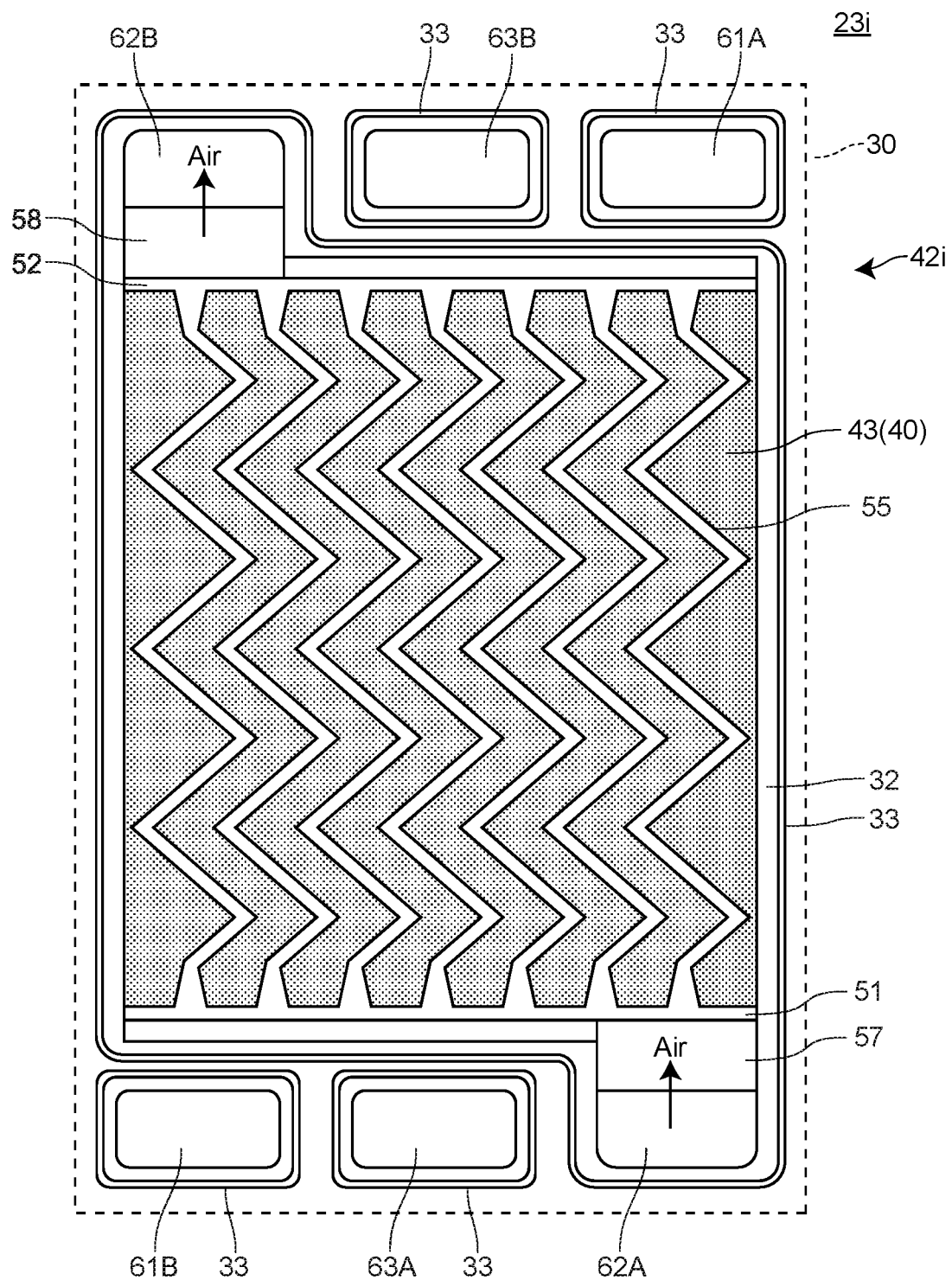
FIG. 19 is a plan view of a fuel cell gas supply and diffusion layer 42i according to a modification 9.

FIG. 19 is a view for explaining a planar structure of a fuel cell gas supply and diffusion layer 42i according to a modification 9. The fuel cell gas supply and diffusion layer 42i according to the modification 9 basically has the same configuration as the fuel cell gas supply and diffusion layer 42h according to the modification 8. However, in the fuel cell gas supply and diffusion layer 42i, a forming width of the inflow side end portion and the outflow side end portion of the gas passage groove 55 differs from that of the fuel cell gas supply and diffusion layer 42h according to the modification 8. That is, in the fuel cell gas supply and diffusion layer 42i according to the modification 9, as shown in FIG. 19, the forming width of the inflow side end portion and the outflow side end portion of the gas passage groove 55 is wider than that of the gas supply and diffusion layer 42h according to the modification 8. Further, the inflow side end portion and the outflow side end portion of the gas passage groove 55 is tapered so as to widen toward the end. According to the fuel cell gas supply and diffusion layer 42i of the modification 9, because of the forming width of the inflow side end portion and the outflow side end portion of the fuel cell gas passage groove 55 is wider than that of the fuel cell gas supply and diffusion layer 42h according to the modification 8 and it is tapered so as to be widen toward the end, the migration resistance at the time of inflow and outflow of the fuel cell gas is further reduced, it is possible to supply even more large amount of the fuel cell gas to the membrane electrode assembly.

Modification 10

Figure 20:
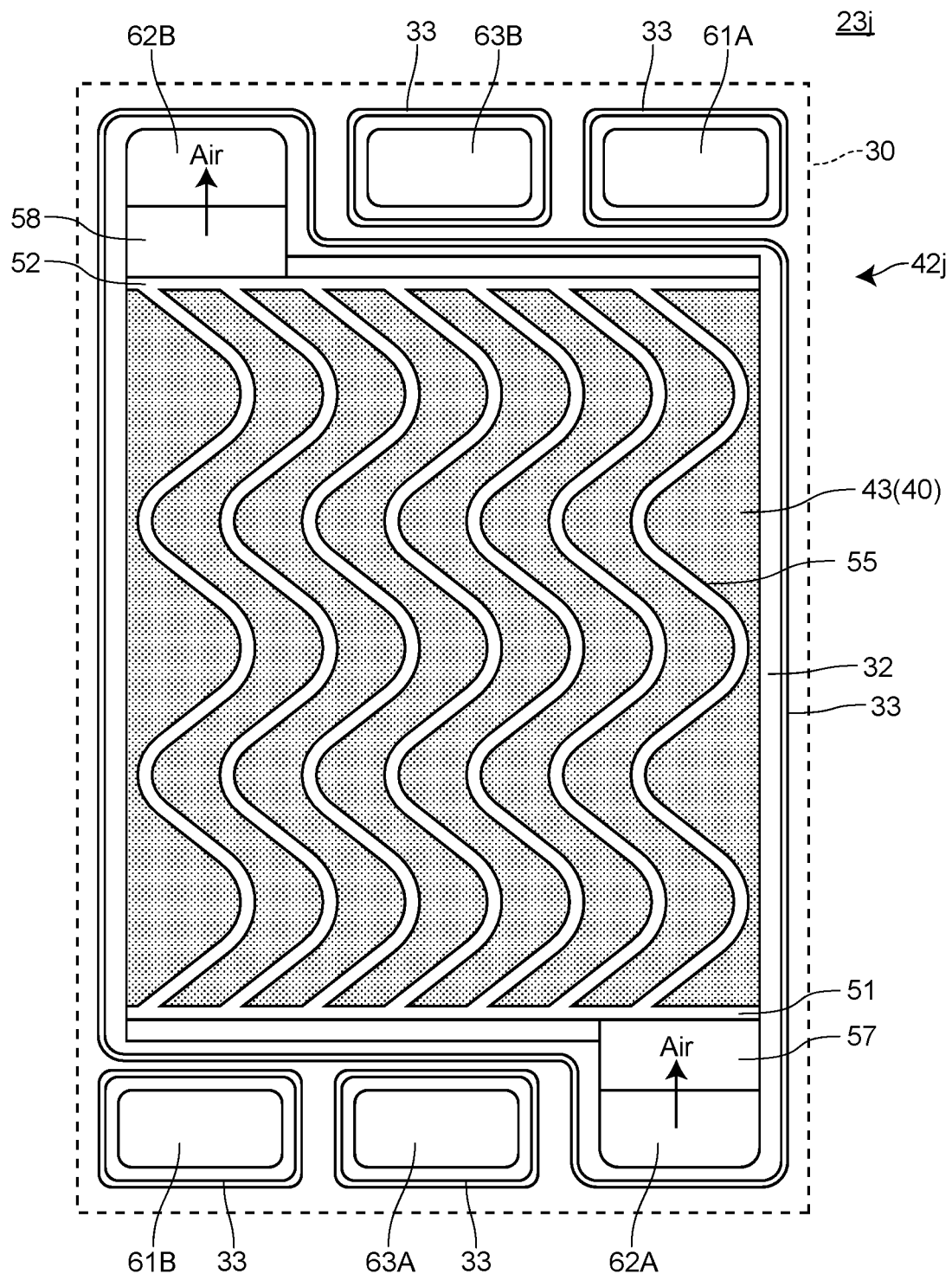
FIG. 20 is a plan view of a fuel cell gas supply and diffusion layer 42j according to a modification 10.

FIG. 20 is a view for explaining a planar structure of a fuel cell gas supply and diffusion layer 42j according to a modification 10. The fuel cell gas supply and diffusion layer 42j according to the modification 10 basically has the same configuration as the fuel cell gas supply and diffusion layer 42 according to the embodiment. However, in the fuel cell gas supply and diffusion layer 42j, a planar shape of the gas passage groove 55 differs from that of the fuel cell gas supply and diffusion layer 42 according to the embodiment. That is, in the fuel cell gas supply and diffusion layer 42j according to the modification 10, as shown in FIG. 20, the planar shape of the plurality of gas passage grooves 55 is formed in a wave shape. In the fuel cell gas supply and diffusion layer 42j according to the modification 10, the planar shape of the gas passage groove 55 differs from that of the fuel cell gas supply and diffusion layer 42 according to the embodiment. However, according to the fuel cell gas supply and diffusion layer 42j, as in the fuel cell gas supply and diffusion layer 42 according to the embodiment, supply paths of the fuel cell gas supplied to the porous body layer are widely dispersed in the plane. Therefore, according to the fuel cell gas supply and diffusion layer 42j, the fuel gas can be uniformly supplied to the membrane electrode assembly compared to a case the plurality of gas passage grooves is formed linearly from the inflow side to the outflow side of the gas.

Modification 11

Figure 21:
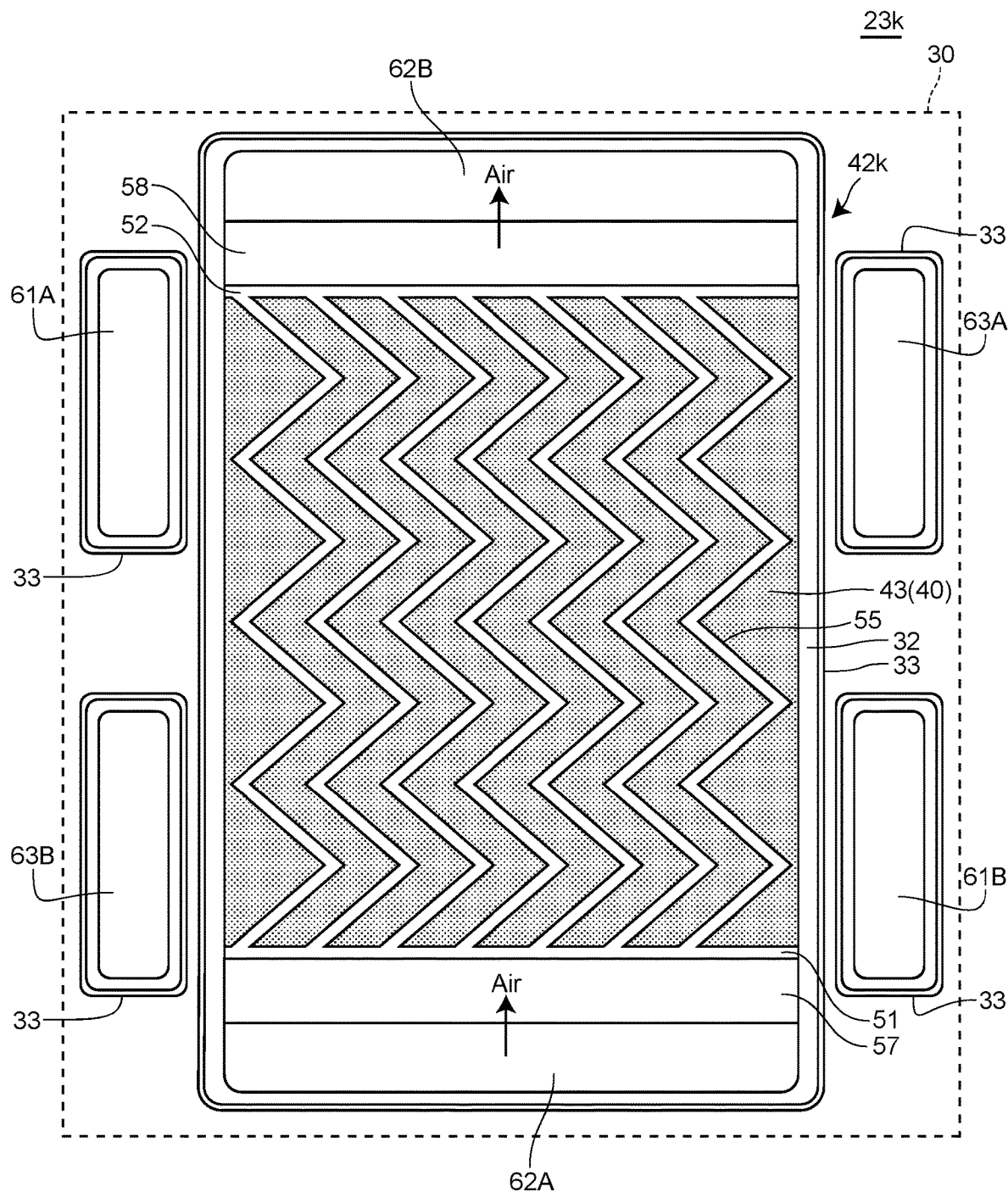
FIG. 21 is a plan view of a fuel cell separator 23k according to a modification 11.

FIG. 21 is a view for explaining a planar configuration of a fuel cell separator 23k according to a modification 11. The fuel cell separator 23k according to the modification 11 is the type-C fuel cell separator, basically has the same configuration as the fuel cell separator 23 according to the embodiment. However, in the fuel cell separator 23k, the cathode gas inflow port 62A and the cathode gas outflow port 62B, the anode gas inflow port 61A and the anode gas outflow port 61B, and the planar structure including the cooling water inflow port 63A and the cooling water outflow port 63B differ from those of the fuel cell separator 23 according to the embodiment. That is, in the fuel cell separator 23k according to the modification 11, as shown in FIG. 21, only the cathode gas inflow port 62A and the cathode gas outflow port 62B are formed at both longitudinal ends of the metal plate 30, respectively. And in the fuel cell separator 23k, the anode gas inflow port 61A and the anode gas outflow port 61B and the cooling water inflow port 63A and the cooling water outflow port 63B are respectively formed at both lateral ends of the metal plate 30. According to the fuel cell separator 23k of the modification 11, it is possible to widen the cathode gas inflow port 62A and the cathode gas outflow port 62B for circulating the cathode gas difficult to diffuse in the fuel cell gas supply and diffusion layer than the anode gas. Therefore, according to the fuel cell separator 23k, a larger amount of the cathode gas can be uniformly supplied to the membrane electrode assembly. Further, according to the fuel cell separator 23k, because of the oxygen gas and the nitrogen gas not used for the power generation can be efficiently discharged outside of the gas passage groove, the power generation of a fuel cell can be more efficient. Further, according to the fuel cell gas supply and diffusion layer 23k of the modification 11, because of the water vapor or the condensed water generated by the membrane electrode assembly at the time of the power generation can be efficiently discharged outside of the gas passage groove, becomes a fuel cell gas supply and diffusion layer with more excellent drainability.

Modification 12

Figure 22:
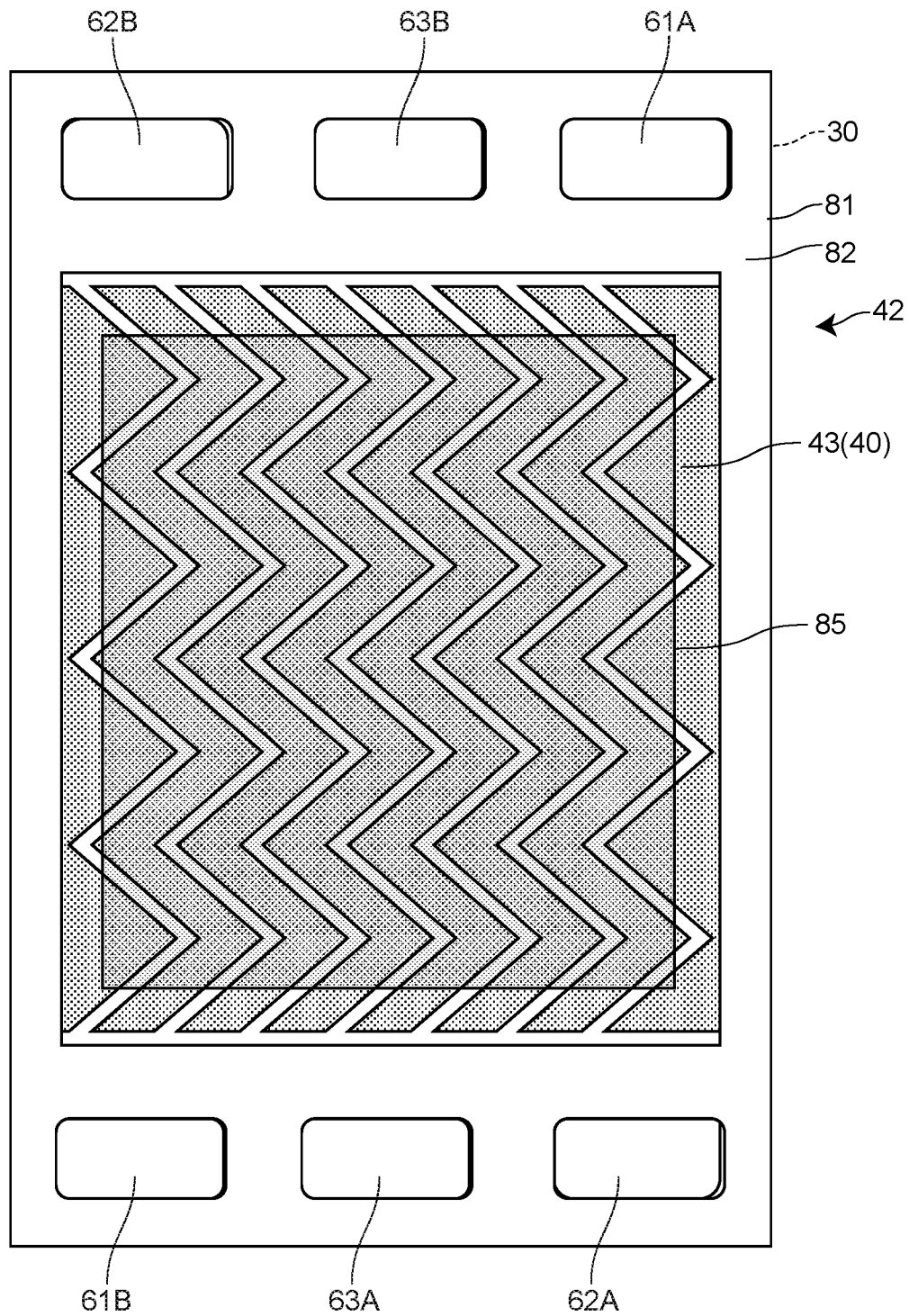
FIG. 22 is a plan view of a fuel cell separator 23L according to a modification 12.

In the embodiment described above, the membrane electrode assembly 81 having the catalyst layer 85 of approximately the same area as the fuel cell gas supply and diffusion layer 42, 41 was used as the membrane electrode assembly. However, the present invention is not limited thereto. As a membrane electrode assembly, the membrane electrode assembly having a catalyst layer 85 with an area smaller than that of the fuel cell gas supply and diffusion layer 42, 41 may be used. FIG. 22 is a plan view of a fuel cell separator 23L according to a modification 12. In the fuel cell separator 23L according to the modification 12, the membrane electrode assembly having the catalyst layer 85 having the area smaller than that of the fuel cell gas supply and diffusion layer 42, 41 is used as the membrane electrode assembly 81. The fuel cell separator 23L is formed by stacking the catalyst layers 85 of the membrane electrode assembly 81 in a central portion of the fuel cell gas supply and diffusion layer 42, 41 (a portion where the cathode gas is uniformly supplied to the membrane electrode assembly 81 of the fuel cell gas supply and diffusion layer 42, 41). According to the fuel cell separator 23L of the modification 12, it is possible to perform power generation in a power generation efficient area where the fuel cell gas is uniformly supplied, it is possible to further increase the power generation efficiency of the fuel cell.

Modification 13

Figure 23A:
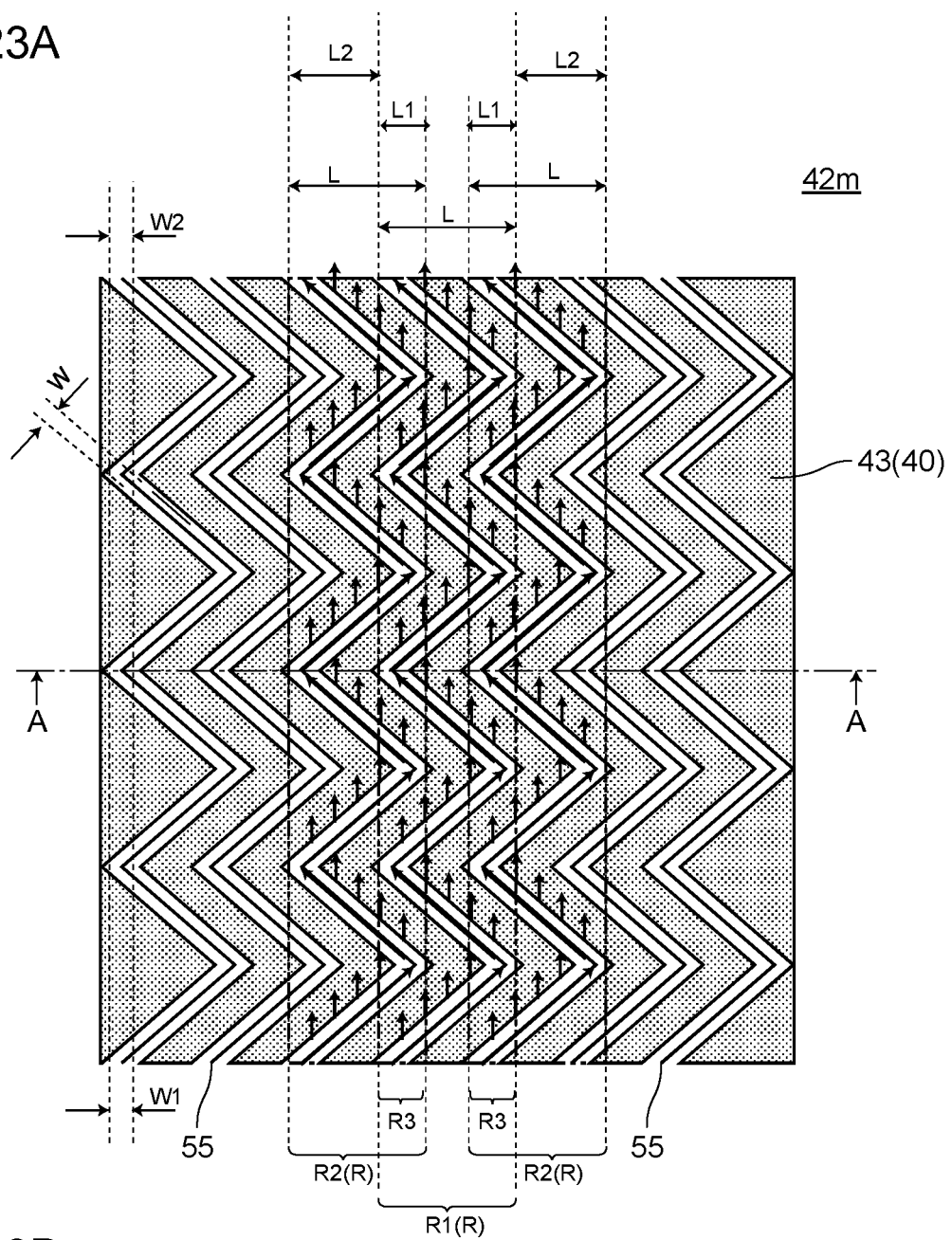
FIGS. 23A and 23B are views showing a planar structure and a cross-sectional structure of gas passage grooves in a modification 13.
Figure 23B:
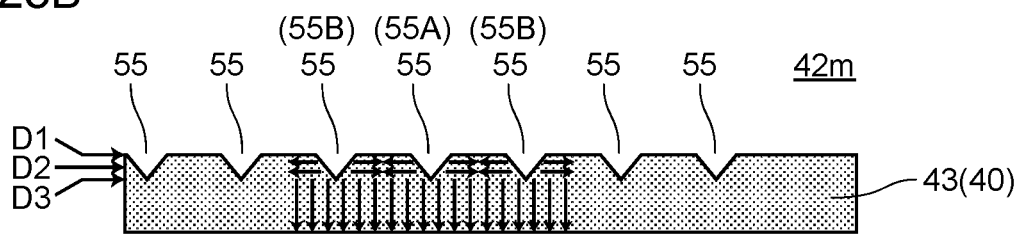

In the embodiment described above, as a gas passage groove, the gas passage groove 55 having a rectangular cross-section in which the width of the gas passage groove on the surfaces of the porous body layers 40 (or the gas passage groove 55) and the width of the gas passage groove on the bottoms of the gas passage groove 55 are equal to each other is used (see FIGS. 5A-5B and FIGS. 7A-7B). However, the present invention is not limited thereto. The fuel cell gas passage groove may be a gas passage groove having a triangular cross section with bottom of the groove narrower than a surface, or a gas passage groove having a semicircular cross-section with bottom of the groove narrower than surface, or a gas passage groove having other shapes. FIGS. 23A-23B and FIGS. 24A-24C are views for explaining patterns for forming gas passage grooves 55 according to a modification 13. Of these, FIGS. 23A and 23B are views showing the construction of the gas passage groove 55. FIGS. 24A-24C are views showing the planar construction of the gas passage groove 55 at different depth locations. FIG. 23A is a plan view. FIG. 23B is an A-A cross-sectional view of FIG. 23A. FIG. 24A shows a planar structure of the gas passage groove 55 at a depth position D1 (a depth position at the surface of the porous body layer 40 (or the gas passage groove 55)). FIG. 24B shows a planar construction of the gas passage groove 55 at a depth position D2 (½ depth position of the gas passage groove 55). FIG. 24C shows a planar construction of the gas passage groove 55 at a depth position D3 (a depth position at the bottom of the gas passage groove 55). In FIGS. 23A-23B and FIGS. 24A-24C, the flow of the cathode gas is shown. In FIG. 23A and FIGS. 24A-24C, arrow in the gas passage groove 55 shows flow along the gas passage groove 55, longitudinally upward arrow in the porous body layer 40 shows a flow of the cathode gas extruded from the gas passage groove 55 into the porous body layer 40 (the gas diffusion layer 43) (an infiltration gas flow). Further, in FIG. 24B, arrow in a lateral and a downward direction (a direction toward the membrane electrode assembly side) described in the porous body 40 shows flow of the cathode gas extruded into the porous body layer 40 (the gas diffusion layer 43) from the gas passage groove 55m to the membrane electrode assembly side.

As shown in FIGS. 23A and 23B, as the gas passage groove, it is also possible to use the triangular cross-section gas passage groove 55 whose bottom of the groove is narrower than the surface. In such a case, since the area of the rectangular region R in the depth position D3 is smaller than the area of the rectangular region R in the depth position D1, disadvantageously in terms of uniformly supplying the fuel cell gas to the membrane electrode assembly. However, even in such a case, as shown in FIG. 24A, FIG. 24B and FIG. 24C, if the overlapping region R3 in which the first rectangular region R1 and the second rectangular region R2 overlap exists at any depth position of the plurality of gas passage grooves 55, the fuel cell gas can be supplied to the membrane electrode assembly more uniformly as in the case of the fuel cell gas supply and diffusion layer 42 according to the embodiment. Therefore, the effect of "the fuel cell gas can be supplied to the membrane electrode assembly more uniformly" of the fuel cell gas supply and diffusion layer according to the present invention can be obtained regardless of the cross-sectional shape of the gas passage groove 55 when the condition that the overlapping region R3 exists at any depth position of the plurality of gas passage grooves 55 is satisfied.

Modification 14

Figure 25A:
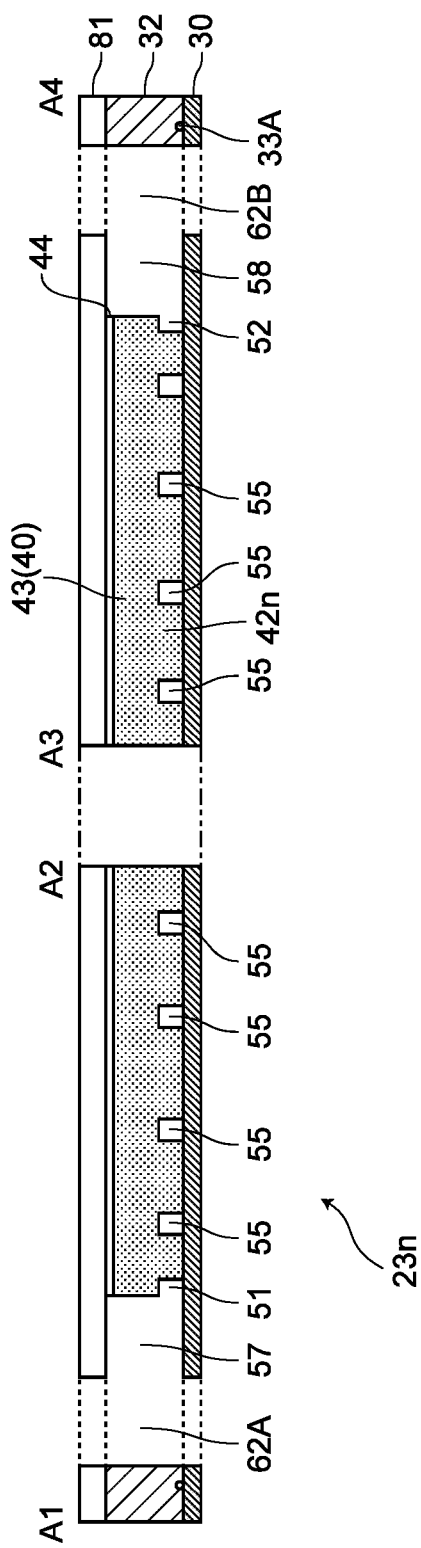
FIGS. 25A and 25B are cross-sectional views of a fuel cell separator 23n according to a modification 14.
Figure 25B:
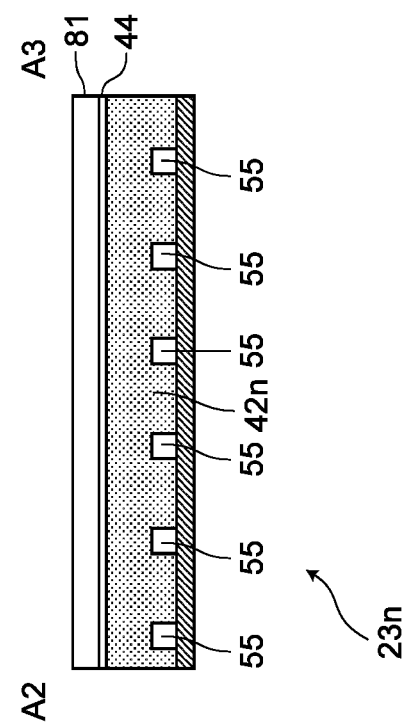
Figure 26:
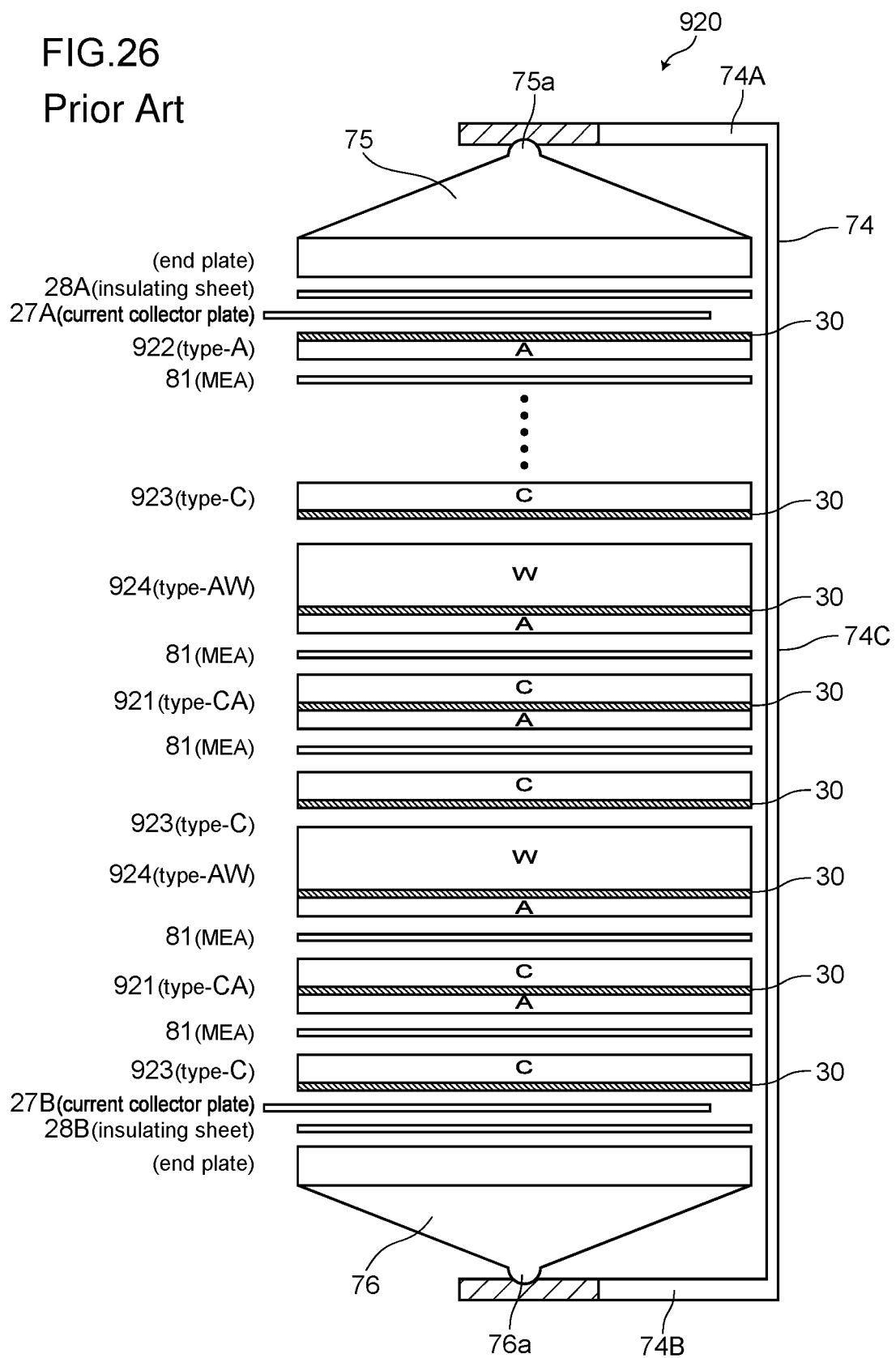
FIG. 26 is a front view of schematically showing a conventional fuel cell stack 920.
Figure 27:
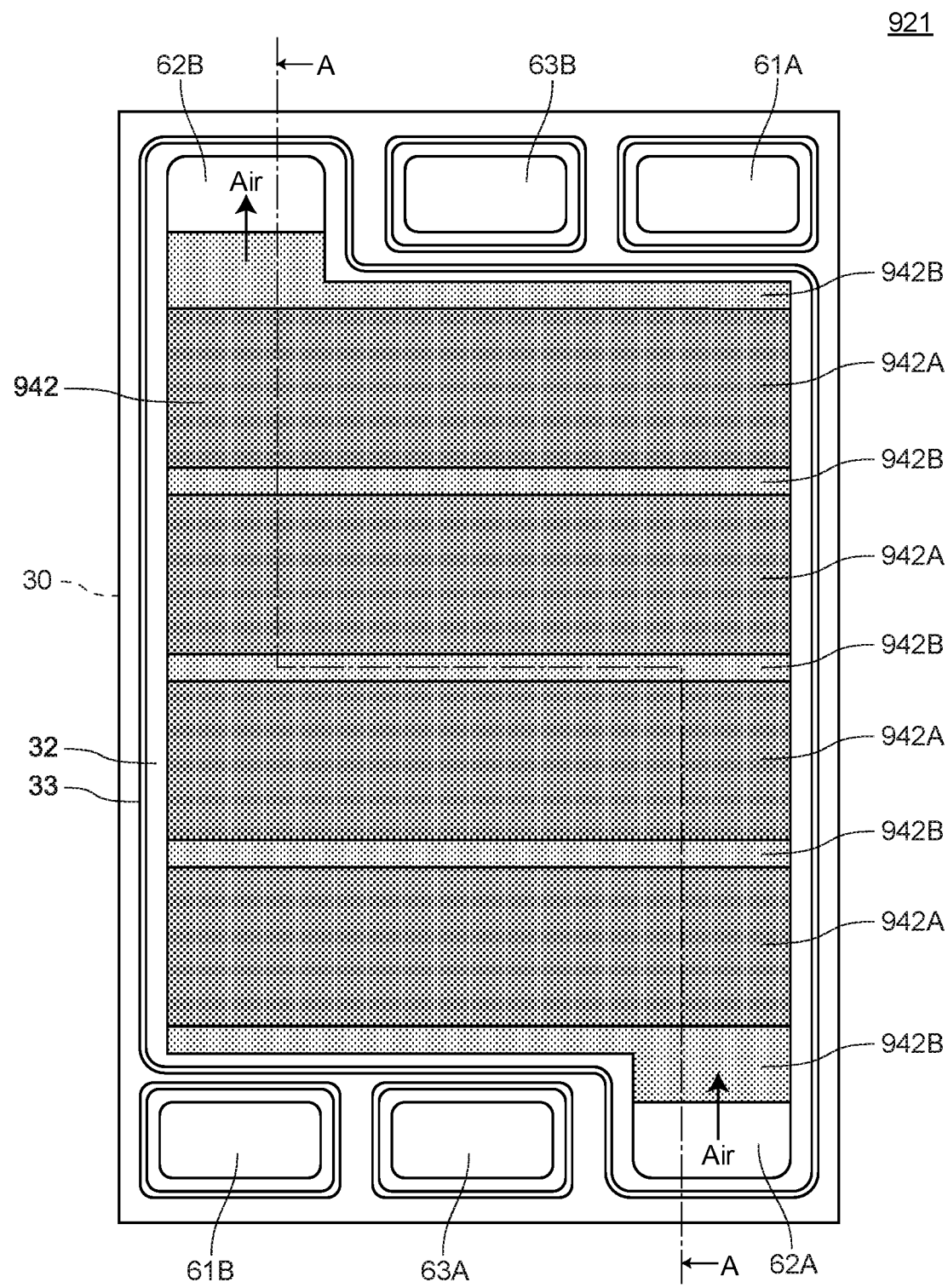
FIG. 27 is a plan view of a type-CA fuel cell separator 921 in the conventional fuel cell stack 920.
Figure 28:
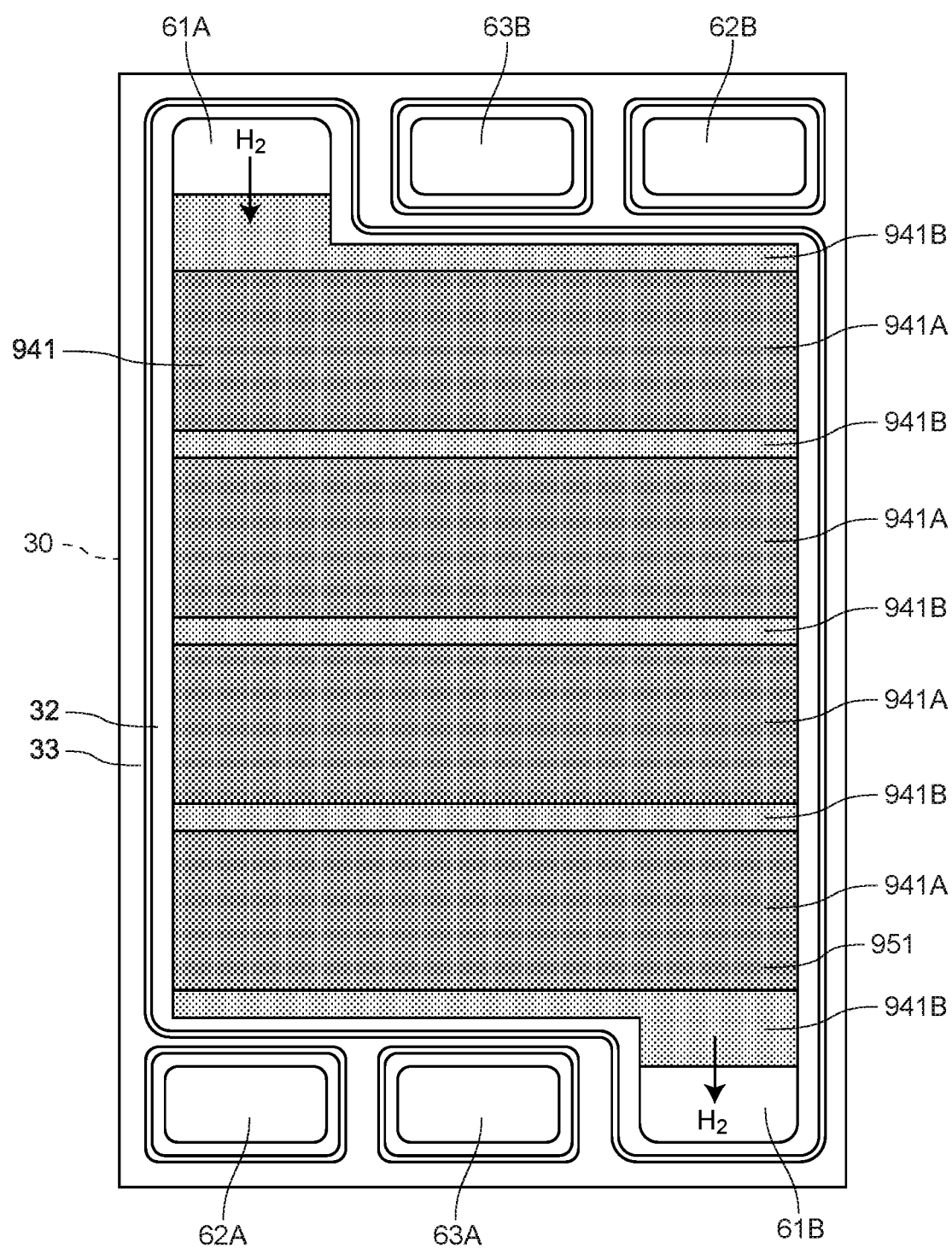
FIG. 28 is a plan view of the type-CA fuel cell separator 921 in the conventional fuel cell stack 920.
Figure 29:
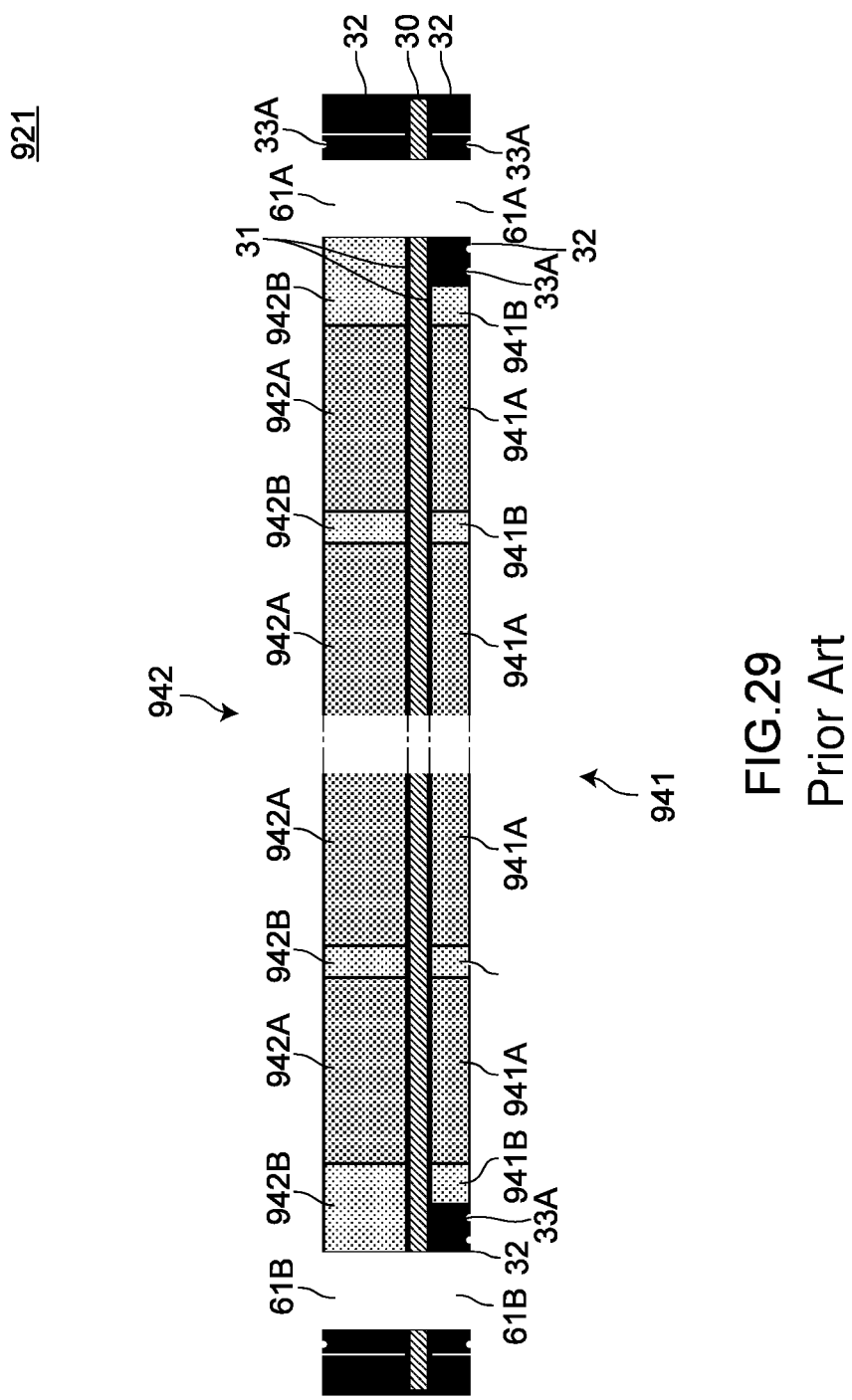
FIG. 29 is a cross-sectional view taken along line A-A of FIG. 27.

In the embodiment described above, as a fuel cell gas supply and diffusion layer, the gas supply and diffusion layer 42 having the porous body layer 40 in which the gas passage groove 55 is formed on one surface was used (see FIGS. 5A and 5B). However, the present invention is not limited thereto. FIGS. 25A and 25B are cross-sectional views of the fuel cell gas supply and diffusion layer 42n according to a modification 14. As in FIGS. 5A and 5B, the fuel cell separator 23n is shown with the membrane electrode assembly 81 bonded. As shown in FIGS. 25A and 25B, it is also possible to use the fuel cell gas supply and diffusion layer including the porous body layer 40 having the gas passage groove 55 formed on one surface thereof and the microporous layer 44 disposed on the other surface of the porous body layer 40. In such a configuration, it is possible to configure a fuel cell separator using a membrane electrode assembly without a microporous layer.

Modification 15

In the embodiment described above, the metal plate 30 was used as the gas shielding plate. However, the present invention is not limited thereto. It is also possible to use a plate (for example, a ceramic plate or a plastic plate) made of a material having a gas shielding property other than the metal plate 30.

Incidentally, in the above modifications, the features described in the respective modifications are those applied to the fuel cell gas supply and diffusion layer 42, the fuel cell separator 23 and the fuel cell stack 20 according to the embodiment. However, the features described in the respective modifications are not limited thereto and are applicable to a fuel cell gas supply and diffusion layer, a fuel cell separator and a fuel cell stack of the present invention in general. For example, the features described in each modification are also applicable to the fuel cell gas supply and diffusion layer 21 of type-CA, the fuel cell gas supply and diffusion layer 24 of type-CW, the fuel cell gas supply and diffusion layer 22 of type-A, the fuel cell gas supply and diffusion layer 25 of type-AW, the fuel cell separator and fuel cell stack with these fuel cell gas supply and diffusion layers.

The fuel cell gas supply and diffusion layer, the fuel cell separator and the fuel cell stack of the invention have been described on the basis of the illustrated embodiment. However, the present invention is not limited to the embodiment described above, and various modifications can be made without departing from the scope of the present invention.

The invention claimed is:

1. A fuel cell gas supply and diffusion layer comprising:
   a sheet-like porous body layer configured to perform gas permeating and gas diffusing, and having conductivity, the porous body layer having first and second surfaces facing outwardly opposite to each other;
   a plurality of gas passage grooves formed in the first surface of the porous body layer, formed in parallel to each other, respectively formed in a zigzag shape or a wave shape in a plan view, and respectively extending from an inflow side toward an outflow side of a gas flow, the inflow side facing the outflow side along a first direction, each of the plurality of gas passage grooves having a plurality of apexes in the plan view, the plurality of gas passage grooves including a first gas passage groove and a second gas passage groove that are adjacent to each other along a second direction perpendicular to the first direction; and
   one or a plurality of gas pressure equalizing grooves formed in the first surface of the porous body layer and configured to equalize a gas flow rate along the second direction, each of the one or the plurality of gas pressure equalizing grooves extending along the second direction over an entirety of a width of the porous body layer and intersecting the plurality of gas passage grooves in the plan view, the one or the plurality of gas pressure equalizing grooves including a first gas pressure equalizing groove,
   wherein the porous body layer has a first rectangular region R1, and the plurality of apexes of the first gas passage groove circumscribe a periphery of the first rectangular region R1 in the plan view,
   the porous body layer has a second rectangular region R2, and the plurality of apexes of the second gas passage groove circumscribe a periphery of the second rectangular region R2 in the plan view,
   the first rectangular region R1 and the second rectangular region R2 are overlapped with each other at an overlapping region R3,
   the overlapping region R3 includes a divided overlapping region R4 that is sandwiched between the first gas pressure equalizing groove and one of the inflow side or the outflow side along the first direction,
   each of the overlapping region R3 and the divided overlapping region R4 exists along an entirety of depths of the first and second gas passage grooves, and
   each of the plurality of gas passage grooves extends without extending in the second direction.

2. The fuel cell gas supply and diffusion layer according to claim 1,
   wherein a width L1 of the overlapping region R3 and a width L of each of the first and second rectangular regions R1 and R2 satisfy $L1 \geq 0.1 \times L$.

3. The fuel cell gas supply and diffusion layer according to claim 2,
   a depth of each of the plurality of gas passage grooves and a depth of each of the one or the plurality of gas pressure equalizing grooves are equal to each other.

4. The fuel cell gas supply and diffusion layer according to claim 2, further comprising:
   a microporous layer disposed on the second surface of the porous body layer.

5. The fuel cell gas supply and diffusion layer according to claim 2,
   wherein the porous body layer is configured to perform the gas permeating and the gas diffusing for cathode gas.

6. The fuel cell gas supply and diffusion layer according to claim 5,
   wherein the cathode gas is air.

7. The fuel cell gas supply and diffusion layer according to claim 5,
   wherein a width W1 of one end of each of the plurality of gas passaged grooves at the inflow side and a width W2 of the other end of the plurality of gas passage grooves at the outflow side satisfy $W2 < W1$.

8. The fuel cell gas supply and diffusion layer according to claim 5,
   wherein a formation density of one end of each of the plurality of gas passage grooves at the outflow side is higher than a formation density of the other end of each of the plurality of gas passage grooves at the inflow side.

9. A fuel cell separator comprising:
   a gas shielding plate; and
   the fuel cell gas supply and diffusion layer according to claim 2 disposed on at least one surface of the gas shielding plate,
   wherein the first surface of the porous body layer of the fuel cell gas supply and diffusion layer is disposed on the gas shielding plate as the plurality of gas passage grooves is located on the gas shielding plate, and
   gas flow paths are constituted of the plurality of gas passage grooves and the gas shielding plate.

10. A fuel cell stack formed by laminating a fuel cell separator and a membrane electrode assembly, the fuel cell stack comprising:
    the fuel cell separator according to claim 9,
    wherein the fuel cell separator and the membrane electrode assembly are laminated so that the membrane electrode assembly is positioned on the second surface of the porous body layer of the fuel cell gas supply and diffusion layer.

11. The fuel cell gas supply and diffusion layer according to claim 1,
wherein a depth of each of the plurality of gas passage grooves and a depth of each of the one or the plurality of gas pressure equalizing grooves are equal to each other.

12. The fuel cell gas supply and diffusion layer according to claim 1, further comprising:
a microporous layer disposed on the second surface of the porous body layer.

13. The fuel cell gas supply and diffusion layer according to claim 1,
wherein the porous body layer is configured to perform the gas permeating and the gas diffusing for cathode gas.

14. The fuel cell gas supply and diffusion layer according to claim 13,
wherein the cathode gas is air.

15. The fuel cell gas supply and diffusion layer according to claim 13,
wherein a width W1 of one end of each of the plurality of gas passage grooves at the inflow side and a width W2 of the other end of the plurality of gas passage grooves at the outflow side satisfy W2<W1.

16. The fuel cell gas supply and diffusion layer according to claim 13,
wherein a formation density of one end of each of the plurality of gas passage grooves at the outflow side is higher than a formation density of the other end of each of the plurality of gas passage grooves at the inflow side.

17. A fuel cell separator comprising:
a gas shielding plate; and
the fuel cell gas supply and diffusion layer according to claim 1 disposed on at least one surface of the gas shielding plate,
wherein the first surface of the porous body layer of the fuel cell gas supply and diffusion layer is disposed on the gas shielding plate as the plurality of gas passage grooves is located on the gas shielding plate, and
gas flow paths are constituted of the plurality of gas passage grooves and the gas shielding plate.

18. A fuel cell stack formed by laminating a fuel cell separator and a membrane electrode assembly, the fuel cell stack comprising:
the fuel cell separator according to claim 17,
wherein the fuel cell separator and the membrane electrode assembly are laminated so that the membrane electrode assembly is positioned on the second surface of the porous body layer of the fuel cell gas supply and diffusion layer.

* * * * *